United States Patent
Saito et al.

(10) Patent No.: US 12,261,335 B2
(45) Date of Patent: Mar. 25, 2025

(54) LIQUID COMPOSITION, POLYMER ELECTROLYTE MEMBRANE, MEMBRANE ELECTRODE ASSEMBLY AND POLYMER ELECTROLYTE FUEL CELL

(71) Applicant: AGC Inc., Tokyo (JP)

(72) Inventors: Susumu Saito, Tokyo (JP); Takumi Okuyama, Tokyo (JP); Hiroyuki Watabe, Tokyo (JP)

(73) Assignee: AGC Inc., Tokyo (JP)

( * ) Notice: Subject to any disclaimer, the term of this patent is extended or adjusted under 35 U.S.C. 154(b) by 748 days.

(21) Appl. No.: 17/333,682

(22) Filed: May 28, 2021

(65) Prior Publication Data

US 2021/0296673 A1 Sep. 23, 2021

Related U.S. Application Data

(63) Continuation of application No. PCT/JP2019/047934, filed on Dec. 6, 2019.

(30) Foreign Application Priority Data

Dec. 7, 2018 (JP) .................. 2018-230348

(51) Int. Cl.
*H01M 8/1039* (2016.01)
*C08K 3/22* (2006.01)
(Continued)

(52) U.S. Cl.
CPC ............. *H01M 8/1039* (2013.01); *C08K 3/22* (2013.01); *C08L 27/12* (2013.01);
(Continued)

(58) Field of Classification Search
CPC ............. H01M 8/1039; H01M 8/1051; H01M 8/1067; C08K 3/22; C08K 2003/2213; C08K 2201/001; C08L 27/12
See application file for complete search history.

(56) References Cited

U.S. PATENT DOCUMENTS

2007/0099052 A1 5/2007 Frey et al.
2008/0138685 A1* 6/2008 Kaneko et al. ..... H01M 8/1039
429/483
(Continued)

FOREIGN PATENT DOCUMENTS

JP 3915846 B2 5/2007

OTHER PUBLICATIONS

International Search Report issued Feb. 10, 2020 in PCT/JP2019/047934, filed on Dec. 6, 2019 therein, 2 pages.
(Continued)

*Primary Examiner* — Matthew T Martin
*Assistant Examiner* — Alexandra J Simmons
(74) *Attorney, Agent, or Firm* — Element IP, PLC

(57) ABSTRACT

To provide a liquid composition capable of forming a polymer electrolyte membrane which is excellent in the initial power generation characteristics when made into a membrane electrode assembly, and which is excellent in durability and has few defects. This liquid composition comprises a liquid medium, a sulfonic acid group-containing fluorocarbon polymer and a hardly soluble cerium compound, wherein the ion exchange capacity of the sulfonic acid group-containing fluorocarbon polymer is from 1.36 to 2.50 meq/g dry resin, the average particle size of the hardly soluble cerium compound is from 1 nm to 3,000 nm, and the ratio of the total number of moles of cerium atoms in the hardly soluble cerium compound to the total number of moles of sulfonic acid groups in the sulfonic acid group-containing fluorocarbon polymer is from 0.001 to 0.3.

14 Claims, 1 Drawing Sheet

(51) Int. Cl.
   *C08L 27/12*   (2006.01)
   *H01M 8/1051*  (2016.01)
   *H01M 8/1067*  (2016.01)

(52) U.S. Cl.
   CPC ....... *H01M 8/1051* (2013.01); *H01M 8/1067* (2013.01); *C08K 2003/2213* (2013.01); *C08K 2201/001* (2013.01)

(56) References Cited

U.S. PATENT DOCUMENTS

| | | |
|---|---|---|
| 2009/0110967 A1 | 4/2009 | Hommura et al. |
| 2013/0052561 A1 | 2/2013 | Hommura et al. |
| 2014/0141357 A1 | 5/2014 | Lochhaas et al. |
| 2015/0155583 A1 | 6/2015 | Oldani et al. |
| 2016/0301092 A1 | 10/2016 | Kim et al. |
| 2018/0273663 A1* | 9/2018 | Dahlke et al. ...... H01M 8/1039 |

OTHER PUBLICATIONS

D'Urso, C., et al., "Towards fuel cell membranes with improved lifetime: Aquivion® Perfluorosulfonic Acid membranes containing immobilized radical scavengers", Journal of Power Sources, 272 (2014), pp. 753-758.

Technical Data Sheet of Aquivion® D79-25BS, Solvay Specialty Polymers, revised Dec. 21, 2015, 3 pages.

* cited by examiner

LIQUID COMPOSITION, POLYMER ELECTROLYTE MEMBRANE, MEMBRANE ELECTRODE ASSEMBLY AND POLYMER ELECTROLYTE FUEL CELL

TECHNICAL FIELD

The present invention relates to a liquid composition, a polymer electrolyte membrane, a membrane electrode assembly and a polymer electrolyte fuel cell.

BACKGROUND ART

A polymer electrolyte fuel cell is, for example, one in which a membrane electrode assembly is sandwiched between two separators to form a cell, and a plurality of such cells are stacked. The membrane electrode assembly comprises an anode and a cathode each having a catalyst layer, and a polymer electrolyte membrane disposed between the anode and the cathode. The polymer electrolyte membrane is, for example, one in which a liquid composition containing a sulfonic acid group-containing fluorocarbon polymer is formed into a membrane shape.

At the time of conducting power generation by a polymer electrolyte fuel cell, hydrogen peroxide or peroxide radicals derived from oxygen gas supplied to the cathode side are generated. Therefore, the polymer electrolyte membrane is required to have durability against hydrogen peroxide or peroxide radicals.

The following has been proposed as a polymer electrolyte membrane excellent in durability against hydrogen peroxide or peroxide radicals.

A polymer electrolyte membrane containing a sulfonic acid group-containing fluorocarbon polymer and cerium ions (Patent Document 1).

PRIOR ART DOCUMENT

Patent Document

Patent Document 1: Japanese Patent No. 3915846

DISCLOSURE OF INVENTION

Technical Problem

However, in a conventional polymer electrolyte membrane, cerium ions in the membrane may move to the catalyst layer after forming a membrane electrode assembly. The cerium ions transferred to the catalyst layer may be ion-exchanged with ion-exchange groups of the ion-exchange resin in the catalyst layer. Therefore, in the conventional membrane electrode assembly provided with the polymer electrolyte membrane, there may be a case where the initial power generation characteristics will be lowered.

Further, the polymer electrolyte membrane is required to have durability against hydrogen peroxide or peroxide radicals in order to enable stable power generation over a long period of time.

In addition, the polymer electrolyte membrane is required to have few defects such as breakage of the membrane.

The present invention is to provide a liquid composition capable of forming a polymer electrolyte membrane which is excellent in initial power generation characteristics when made into a membrane electrode assembly, and which is excellent in durability and has few defects; a polymer electrolyte membrane which is excellent in initial power generation characteristics when made into a membrane electrode assembly and which is excellent in durability and has few defects; a membrane electrode assembly and a polymer electrolyte fuel cell which are excellent in initial power generation characteristics and which are capable of stable power generation over a long period of time.

Solution to Problem

The present invention has the following embodiments.

[1] A liquid composition comprising a liquid medium, a sulfonic acid group-containing fluorocarbon polymer, and a hardly soluble cerium compound, wherein the ion exchange capacity of the sulfonic acid group-containing fluorocarbon polymer is from 1.36 to 2.50 meq/g dry resin, the average particle size of the hardly soluble cerium compound is from 1 nm to 3,000 nm, and the ratio of the total number of moles of cerium atoms in the hardly soluble cerium compound to the total number of moles of sulfonic acid groups contained in the sulfonic acid group-containing fluorocarbon polymer is from 0.001 to 0.3.

[2] The liquid composition according to [1], wherein the hardly soluble cerium compound is cerium oxide.

[3] The liquid composition according to [1] or [2], wherein the sulfonic acid group-containing fluorocarbon polymer has either one or both of units represented by the following formula u1 and units represented by the following formula u2:

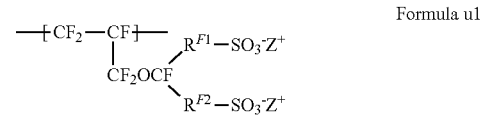

Formula u1

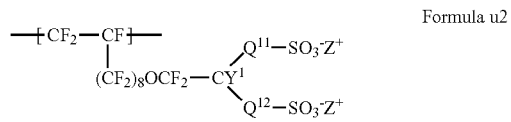

Formula u2 where in the formula u1, $R^{F1}$ and $R^{F2}$ are each a $C_{1-3}$ perfluoroalkylene group, $Z^+$ is $H^+$, a monovalent metal ion or an ammonium ion in which at least one hydrogen atom may be substituted by a hydrocarbon group, and $R^{F1}$ and $R^{F2}$ may be the same or different, and in the formula u2, $Q^{11}$ is a perfluoroalkylene group which may have an etheric oxygen atom, and $Q^{12}$ is a single bond or a perfluoroalkylene group which may have an etheric oxygen atom, $Y^1$ is a fluorine atom or a monovalent perfluoroorganic group, s is 0 or 1, and $Z^+$ is $H^+$, a monovalent metal ion or an ammonium ion in which at least one hydrogen atom may be substituted by a hydrocarbon group.

[4] The liquid composition according to any one of [1] to [3], wherein the hardly soluble cerium compound has an average particle size of from 1 nm to 400 nm.

[5] The liquid composition according to any one of [1] to [4], wherein the content of the sulfonic acid group-containing fluorocarbon polymer is from 1 to 50 mass % to 100 mass % of the liquid composition.

[6] The liquid composition according to any one of [1] to [5], wherein the liquid medium contains an organic solvent having a hydroxy group.

[7] The liquid composition according to any one of [1] to [6], which further contains cerium ions.

[8] A polymer electrolyte membrane comprising a sulfonic acid group-containing fluorocarbon polymer, and a hardly soluble cerium compound, wherein the ion exchange capacity of the sulfonic acid group-containing fluorocarbon polymer is from 1.36 to 2.50 meq/g dry resin, the average particle size of the hardly soluble cerium compound is from 1 nm to 3,000 nm, and the ratio of the total number of moles of cerium atoms in the hardly soluble cerium compound to the total number of moles of sulfonic acid groups contained in the sulfonic acid group-containing fluorocarbon polymer is from 0.001 to 0.3.

[9] The polymer electrolyte membrane according to [8], wherein the hardly soluble cerium compound is cerium oxide.

[10] The polymer electrolyte membrane according to [8] or [9], wherein the sulfonic acid group-containing fluorocarbon polymer has at least units represented by the following formula u1 or units represented by the following formula u2.

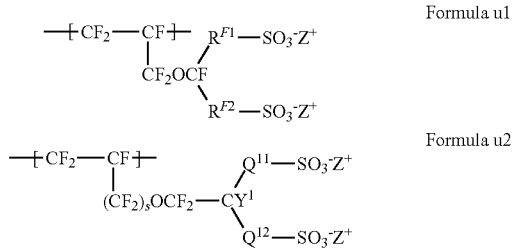

Formula u1

Formula u2 where in the formula u1, $R^{F1}$ and $R^{F2}$ are each a $C_{1-3}$ perfluoroalkylene group, $Z^+$ is $H^+$, a monovalent metal ion or an ammonium ion in which at least one hydrogen atom may be substituted by a hydrocarbon group, and $R^{F1}$ and $R^{F2}$ may be the same or different, and in the formula u2, $Q^{11}$ is a perfluoroalkylene group which may have an etheric oxygen atom, and $Q^{12}$ is a single bond or a perfluoroalkylene group which may have an etheric oxygen atom, $Y^1$ is a fluorine atom or a monovalent perfluoroorganic group, s is 0 or 1, and $Z^+$ is $H^+$, a monovalent metal ion, or an ammonium ion in which at least one hydrogen atom may be substituted by a hydrocarbon group.

[11] The polymer electrolyte membrane according to any one of [8] to [10], wherein the hardly soluble cerium compound has an average particle size of from 1 nm to 400 nm.

[12] The polymer electrolyte membrane according to any one of [8] to [11], which further contain cerium ions.

[13] A membrane electrode assembly comprising an anode having a catalyst layer, a cathode having a catalyst layer, and a polymer electrolyte membrane as defined in any one of [8] to [12], which is disposed between the anode and the cathode.

[14] A polymer electrolyte fuel cell provided with the membrane electrode assembly as defined in [13].

Advantageous Effects of Invention

According to the liquid composition of the present invention, it is possible to form a polymer electrolyte membrane which is excellent in initial power generation characteristics when made into a membrane electrode assembly, and which is excellent in durability and has few defects.

The polymer electrolyte membrane of the present invention is excellent in initial power generation characteristics when made into a membrane electrode assembly, and which is excellent in durability and has few defects.

The membrane electrode assembly and the polymer electrolyte fuel cell of the present invention are provided with a polymer electrolyte membrane which is excellent in initial power generation characteristics and which is capable of stable power generation over a long period of time.

DESCRIPTION OF EMBODIMENTS

In the present specification, units represented by the formula u1 are referred to as units u1. Units represented by other formulas are also referred to in the same manner.

In the present specification, a compound represented by the formula 1 is referred to as compound 1. Compounds represented by other formulas are also referred to in the same manner.

A "sulfonic acid group" is a general term for a salt-type sulfonic acid group ($-SO_3^-$ $Z^+$, where in $Z^+$ is $H^+$, a monovalent metal ion, or an ammonium ion in which at least one hydrogen atom may be substituted by a hydrocarbon group) and an acid-type sulfonic acid group ($-SO_3^-H^+$).

A "hardly soluble cerium compound" means a cerium compound, of which the solubility in water at 25° C. is at most 0.1 g to 100 g of water.

The "total number of moles of cerium atoms in the hardly soluble cerium compound" is the total number of moles of the number of cerium atoms contained in the hardly soluble cerium compound. For example, in a case where one molecule of a hardly soluble cerium compound has two cerium atoms, the total number of moles of cerium atoms in the hardly soluble cerium compound becomes to be the total number of moles of the hardly soluble cerium compound×2.

An "ion-exchange group" is a group in which a cation contained in the group can be exchanged to another cation.

A "unit" in a polymer is a general term for an atomic group directly formed by polymerization of one molecule of a monomer and an atomic group obtained by chemically converting a part of the atomic group.

The "ion exchange capacity" of a polymer is obtained by the method as described in Examples.

The "volume flow rate value" of a polymer is obtained by the method as described in Examples. In this specification, the volume flow rate value is referred to as "TQ value".

The "average particle size" of the hardly soluble cerium compound is obtained by the method as described in Examples.

Figure 1:
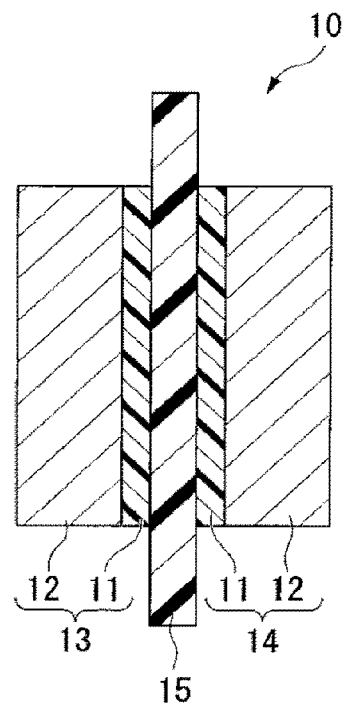
FIG. 1 is a schematic cross-sectional view showing an example of a membrane electrode assembly.
Figure 2:
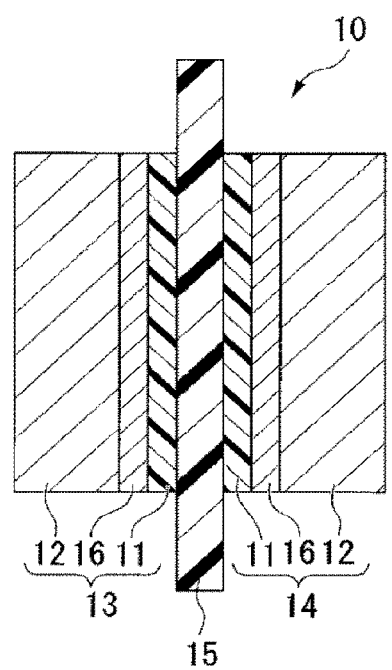
FIG. 2 is a schematic cross-sectional view showing another example of a membrane electrode assembly.

The dimensional ratios in FIGS. 1 and 2 are different from the actual ones for convenience of explanation.

<Liquid Composition>

The liquid composition of the present invention comprises a liquid medium, a sulfonic acid group-containing fluorocarbon polymer and a hardly soluble cerium compound.

The liquid composition of the present invention may further contain cerium ions.

The liquid composition of the present invention may further contain components other than the essential components so long as the effects of the present invention are not impaired.

The liquid medium may be water, an organic solvent, a mixed solvent of water and an organic solvent, or the like, and among them, a mixed solvent of water and an organic solvent is preferred.

Water improves the dispersibility or solubility of the sulfonic acid group-containing fluorocarbon polymer to the liquid medium.

The organic solvent facilitates the formation of a hardly breakable polymer electrolyte membrane.

As the organic solvent, an organic solvent having a hydroxy group is preferred, and at least one type of a $C_{1-4}$ alcohol is more preferred, from the viewpoint of easily forming a hardly breakable polymer electrolyte membrane.

The $C_{1-4}$ alcohol may, for example, be methanol, ethanol, 1-propanol, 2-propanol, 1-butanol, 2,2,2-trifluoroethanol, 2,2,3,3,3-pentafluoro-1-propanol, 2,2,3,3-tetrafluoro-1-propanol, 1,1,1,3,3,3-hexafluoro-2-propanol or 3,3,3-trifluoro-1-propanol.

As the $C_{1-4}$ alcohol, one type may be used alone, or two or more types in combination.

The proportion of water is preferably from 10 to 99 mass %, more preferably from 40 to 99 mass %, to the total amount of the liquid medium.

The proportion of the organic solvent is preferably from 1 to 90 mass %, more preferably from 1 to 60 mass %, to the total amount of the liquid medium.

When the proportions of water and the organic solvent are within the above ranges, the dispersibility of the sulfonic acid group-containing fluorocarbon polymer to the dispersion medium is excellent, and a hardly breakable polymer electrolyte membrane is easily formed.

The sulfonic acid group-containing fluorocarbon polymer is a polymer having perfluoromonomer units and having sulfonic acid groups ($-SO_3^-Z^+$) (hereinafter referred to as "polymer H").

The ion exchange capacity of the polymer H is from 1.36 to 2.50 meq/g dry resin (hereinafter simply referred to also as "meq/g"), preferably from 1.37 to 2.49 meq/g, more preferably from 1.38 to 2.48 meq/g.

When the ion exchange capacity is at least the lower limit value in the above range, even if cerium ions are generated in the polymer electrolyte membrane, the polymer H can sufficiently capture the cerium ions in the polymer electrolyte membrane. Further, since the conductivity of the polymer H is increased, a sufficient cell output can be obtained when used as a polymer electrolyte membrane of a polymer electrolyte fuel cell. When the ion exchange capacity is at most the upper limit value in the above range, swelling when the polymer H is saturated is suppressed, and the mechanical strength of the polymer electrolyte membrane becomes high.

The content of the polymer H is preferably from 1 to 50 mass %, more preferably from 3 to 30 mass %, to 100 mass % of the liquid composition. When the content of the polymer H is at least the lower limit value in the above range, a thick membrane can be stably obtained at the time of membrane formation. When the content of the polymer H is at most the upper limit value in the above range, it is possible to prevent the viscosity of the liquid composition from becoming excessively high.

The perfluoromonomer units may, for example, be perfluoromonomer units not having an ion exchange group or its precursor group, or perfluoromonomer units having ion exchange groups.

The perfluoromonomer not having an ion exchange group or its precursor group may, for example, be tetrafluoroethylene (hereinafter referred to as "TFE"), hexafluoropropylene, perfluoro(alkyl vinyl ether), or perfluoromonomers having a 5-membered ring as disclosed in WO 2011/013578.

The perfluoromonomer units having ion-exchange groups may, for example, be perfluoromonomer units having known ion-exchange groups as described in WO 2017/221840, WO 2018/012374 or the like, or units u1 as described later. As the perfluoromonomer units having ion exchange groups, perfluoromonomer units having sulfonic acid groups are preferred. The perfluoromonomer units having sulfonic acid groups may, for example, be units u1, units u2 or units u3, which will be described later.

The polymer H may have units (hereinafter referred to also as "other units") based on a monomer (hereinafter referred to as "other monomer") other than a perfluoromonomer, as the case requires, so long as the effects of the present invention are not impaired.

Other monomer may, for example, be chlorotrifluoroethylene, trifluoroethylene, vinylidene fluoride, vinyl fluoride, ethylene, propylene, a (perfluoroalkyl)ethylene, a (perfluoroalkyl)propene, a perfluorovinyl ether (a perfluoro(alkyl vinyl ether), a perfluoro (etheric oxygen atom-containing alkyl vinyl ether), etc.), a perfluoromonomer having a 5-membered ring as described in WO 2011/013578, etc.

The polymer H is preferably one which has at least units u1 or units u2 from such a viewpoint that it is thereby easy to form a polymer electrolyte membrane excellent in initial power generation characteristics and durability. The polymer H is preferably one which further has TFE units from the viewpoint of excellent mechanical properties and durability.

The polymer H may have one type, or two or more types, of each of the units u1, the units u2 and other units.

The units u1 are represented by the following formula.

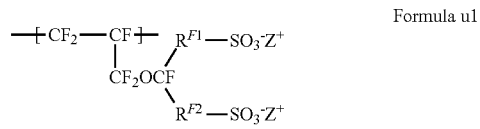

Formula u1

In the formula u1, $R^{F1}$ and $R^{F2}$ are each a $C_{1-3}$ perfluoroalkylene group, and $Z^+$ is $H^+$, a monovalent metal ion, or an ammonium ion in which at least one hydrogen atom may be substituted by a hydrocarbon group. $R^{F1}$ and $R^{F2}$ may be the same or different.

As $R^{F1}$ and $R^{F2}$, for example, $-CF_2-$, $-CF_2CF_2-$, $-CF(CF_3)-$, $-CF_2CF_2CF_2-$, $-CF(CF_2CF_3)-$, $-CF(CF_3)CF_2-$, $-CF_2CF(CF_3)-$ or $-C(CF_3)(CF_3)-$ may be mentioned. From such a viewpoint that raw material is less expensive, production of compound 7 to be described later is easy and the ion exchange capacity of the polymer H can be made higher, $R^{F1}$ and $R^{F2}$ are each preferably a $C_{1-2}$ perfluoroalkylene group, and in the case of $C_2$, a straight chain is preferred. Specifically, $-CF_2-$, $-CF_2CF_2-$ or $-CF(CF_3)-$ is preferred, and $-CF_2-$ is more preferred.

The units u2 are represented by the following formula.

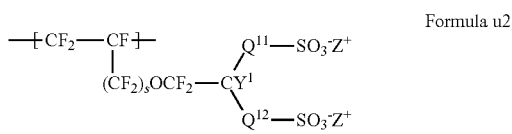

Formula u2

In the formula u2, $Q^{11}$ is a perfluoroalkylene group which may have an etheric oxygen atom, $Q^{12}$ is a single bond or a perfluoroalkylene group which may have an etheric oxygen atom, $Y^1$ is a fluorine atom or a monovalent perfluoroorganic group, s is 0 or 1, and $Z^+$ is $H^+$, a monovalent metal ion, or an ammonium ion in which at least one hydrogen atom may be substituted by a hydrocarbon group. The organic group means a group containing at least one carbon atom.

In a case where the perfluoroalkylene group in $Q^{11}$ or $Q^{12}$ has an etheric oxygen atom, the number of such an oxygen atom may be one or may be two or more. Further, such an oxygen atom may be inserted between carbon atom-carbon atom bond of the perfluoroalkylene group, or may be inserted at an end of the carbon atom bond.

The perfluoroalkylene group in $Q^{11}$ or $Q^{12}$ may be linear or may be branched, and is preferably linear.

The number of carbon atoms in the perfluoroalkylene group is preferably from 1 to 6, more preferably from 1 to 4. When the number of carbon atoms is at most 6, the boiling point of the raw material monomer becomes low, and distillation purification becomes easy. Further, when the number of carbon atoms is at most 6, a decrease in the ion exchange capacity of the polymer H is suppressed, and a decrease in the proton conductivity is suppressed.

$Q^{12}$ is preferably a $C_{1-6}$ perfluoroalkylene group which may have an etheric oxygen atom. When $Q^{12}$ is a $C_{1-6}$ perfluoroalkylene group which may have an etheric oxygen atom, at the time when the polymer electrolyte fuel cell is operated for a longer period of time than when $Q^{12}$ is a single bond, the stability of power generation performance is more excellent.

At least one of $Q^{11}$ and $Q^{12}$ is preferably a $C_{1-6}$ perfluoroalkylene group having an etheric oxygen atom. A monomer having a $C_{1-6}$ perfluoroalkylene group having an etheric oxygen atom can be synthesized without undergoing a fluorination reaction with fluorine gas, whereby the yield is good and the production is easy.

$Q^{11}$ and $Q^{12}$ are each preferably a perfluoroalkylene group having an etheric oxygen atom. When $Q^{11}$ and $Q^{12}$ are each a perfluoroalkylene group having an etheric oxygen atom, the flexibility of the polymer H is improved. The polymer electrolyte membrane containing the highly flexible polymer H is less likely to be broken even if swelling in a wet state and shrinkage in a dry state are repeated.

As $Y^1$, a fluorine atom or a $C_{1-6}$ linear perfluoroalkyl group which may have an etheric oxygen atom, is preferred.

As the units u2, units u2-1 to u2-3 are preferred, from such a viewpoint that production of the polymer H is thereby easy, and industrially implementation is easy. Units u2-2 or units u2-3 are more preferred, from such a viewpoint that the obtainable polymer H is flexible, and when made into a polymer electrolyte membrane, it is less likely to be broken even if swelling in a wet state and shrinkage in a dry state are repeated.

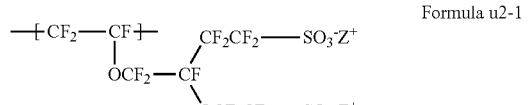

Formula u2-1

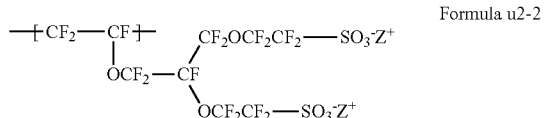

Formula u2-2

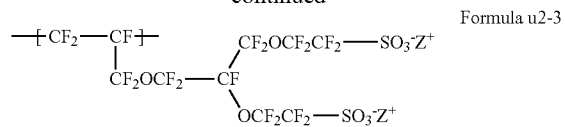

Formula u2-3

The polymer H may be one which has units having only one ion exchange group. Units having only one ion exchange group may, for example, be units u3.

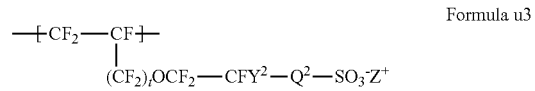

Formula u3

In the formula u3, $Q^2$ is a single bond, or a perfluoroalkylene group which may have an etheric oxygen atom, $Y^2$ is a fluorine atom or a monovalent perfluoro organic group, t is 0 or 1, and $Z^+$ is $H^+$, a monovalent metal ion, or an ammonium ion in which at least one hydrogen atom may be substituted by a hydrocarbon group. The organic group means a group containing at least one carbon atom.

In a case where the perfluoroalkylene group of $Q^2$ has an etheric oxygen atom, the number of such an oxygen atom may be one or may be two or more. Further, such an oxygen atom may be inserted between carbon atom-carbon atom bond of the perfluoroalkylene group, or may be inserted at an end of the carbon atom bond.

The perfluoroalkylene group of $Q^2$ may be linear, or may be branched.

As the monovalent perfluoroorganic group of $Y^2$, a trifluoromethyl group may be mentioned.

As the units u3, units u3-1 to u3-4 may be mentioned.

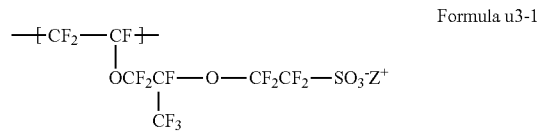

Formula u3-1

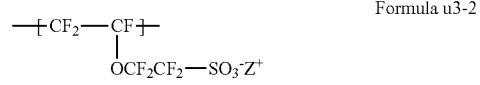

Formula u3-2

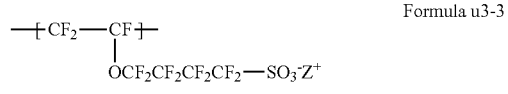

Formula u3-3

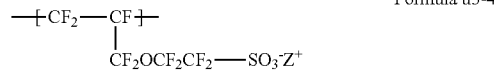

Formula u3-4

The proportions of the respective units in the polymer H are suitably determined depending on the characteristics and physical properties (hydrogen gas permeability, hot water resistance, ion exchange capacity, conductivity, mechanical strength, elastic modulus, softening temperature, etc.) required for the polymer H.

The polymer H is obtainable, for example, by converting the fluorosulfonyl groups ($-SO_2F$) of polymer F which will be described later, to sulfonic acid groups ($-SO_3^-Z^+$).

As a method of converting fluorosulfonyl groups to sulfonic acid groups, there is a method of hydrolyzing the fluorosulfonyl groups of the polymer F to form salt-type sulfonic acid groups.

The hydrolysis is carried out, for example, by bringing the polymer F into contact with a basic compound in a solvent. The basic compound may, for example, be sodium hydroxide, potassium hydroxide or triethylamine. The solvent may, for example, be water, or a mixed solvent of water and a polar solvent. The polar solvent may, for example, be an alcohol (methanol, ethanol, etc.) or dimethyl sulfoxide.

In a case where a polymer H having acid-type sulfonic acid groups is to be obtained, the polymer F is hydrolyzed, and then the salt-type sulfonic acid groups are converted to an acid-type to form acid-type sulfonic acid groups.

The conversion to an acid type is carried out, for example, by bringing a polymer having salt-type sulfonic acid groups into contact with an aqueous solution of hydrochloric acid, sulfuric acid, nitric acid or the like. The temperature for the hydrolysis and conversion to an acid type is preferably from 0 to 120° C. It is preferred to wash the polymer H with water after the hydrolysis or conversion to acid type.

In order to remove organic substances contained as impurities in the polymer H, after the hydrolysis, the organic substances may be decomposed by a treatment such as immersing the polymer H in a hydrogen peroxide solution.

The concentration of hydrogen peroxide in the hydrogen peroxide solution is preferably from 0.1 to 30 mass %, more preferably at least 1 mass % and less than 10 mass %. When the concentration of hydrogen peroxide in the hydrogen peroxide solution is at least the lower limit value in the above range, the effect of decomposing organic substances is sufficient. When the concentration of hydrogen peroxide in the hydrogen peroxide solution is at most the upper limit value in the above range, the polymer H is less likely to be decomposed.

The temperature of the hydrogen peroxide solution is preferably from 15 to 90° C., more preferably at least 40° C. and lower than 80° C. When the temperature of the hydrogen peroxide solution is at least the lower limit value in the above range, the effect of decomposing organic substances is sufficient. When the temperature of the hydrogen peroxide solution is at most the upper limit value in the above range, hydrogen peroxide is less likely to be decomposed.

The time for immersing the polymer H in the hydrogen peroxide solution depends on the thickness of the polymer H and the amount of organic substances contained therein, but, for example, when the polymer H is a membrane having a thickness of 50 μm, from 0.5 to 100 hours is preferred. If the immersion time is less than 0.5 hour, it is difficult to decompose the organic substances inside the membrane. Even if it is immersed for more than 100 hours, the effect of further decomposing organic substances cannot be expected.

It is preferred to wash the polymer H with water after immersing it in the hydrogen peroxide solution. Ultrapure water is preferred as the water to be used for washing with water. In addition, treatment for conversion to an acid type may be performed before washing with water.

The shape of the final polymer H after completion of the above treatment may be in the form of a powder, pellets, or a membrane.

The polymer F which is a precursor of the polymer H, is a polymer having perfluoromonomer units and having fluorosulfonyl groups ($-SO_2F$).

The perfluoromonomer units may, for example, be perfluoromonomer units not having an ion exchange group or its precursor group, or perfluoromonomer units having a precursor group of an ion exchange group.

The perfluoromonomer not having an ion exchange group or its precursor group may be a perfluoromonomer not having an ion exchange group or its precursor as described for the polymer H.

The perfluoromonomer units having a precursor group of an ion exchange group may, for example, be perfluoromonomer units having a precursor group of a known ion exchange group as described in WO 2017/221840, WO 2018/012374, etc., or units u4 as described later.

As the perfluoromonomer units having a precursor group of an ion exchange group, perfluoromonomer units having a fluorosulfonyl group is preferred. The perfluoromonomer units having a fluorosulfonyl group may be units u4, units u5 or units u6 as described later.

The polymer F may have other units, as the case requires, so long as the effects of the present invention are not impaired.

The polymer F is preferably one which has either one or both of the units u4 and the units u5 from such a viewpoint that it is thereby easy to form a polymer electrolyte membrane excellent in initial power generation characteristics and durability. As the polymer F, one further having TFE units is preferred from such a viewpoint that it is thereby possible to obtain a polymer H excellent in mechanical properties and durability.

The units u4 are represented by the following formula.

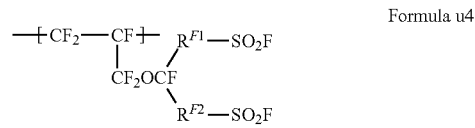

Formula u4

In the formula u4, $R^{F1}$ and $R^{F2}$ are the same as $R^{F1}$ and $R^{F2}$ as described for the units u1, and the preferred forms are also the same.

The units u5 are represented by the following formula.

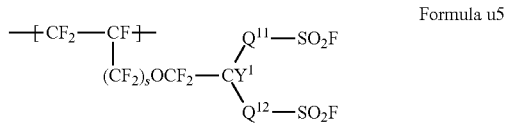

Formula u5

In the formula u5, $Q^{11}$, $Q^{12}$, $Y^1$ and s are the same as $Q^{11}$, $Q^{12}$, $Y^1$ and s as described for the units u2, and the preferred forms are also the same.

As the units u5, units u5-1 to u5-3 are preferred from such a viewpoint that production of the polymer F is thereby easy, and industrial implementation is easy. The units u5-2 or u5-3 are more preferred from such a viewpoint that the obtainable polymer F is flexible, when converted to a polymer H and made into a polymer electrolyte membrane, it is less likely to be broken even if swelling in a wet state and shrinkage in a dry state are repeated, whereby durability tends to be good, and the difference between the elastic modulus in the wet state and the elastic modulus in the dry state tends to be small, whereby cracks due to wrinkles generated by repeating swelling in the wet state and shrinkage in the dry state are unlikely to develop, and it is easy to maintain good power generation performance.

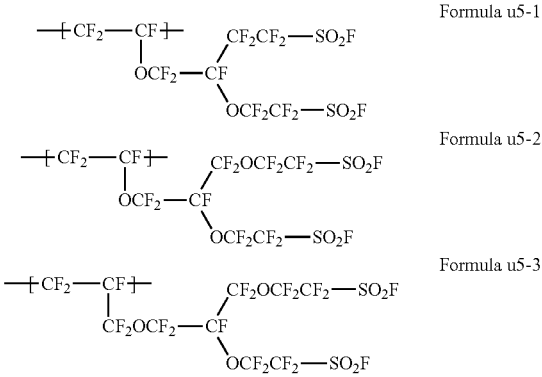

Formula u5-1

Formula u5-2

Formula u5-3

The polymer F may be one which has units having only one precursor group of an ion exchange group. The units having only one precursor group of an ion exchange group may be units u6.

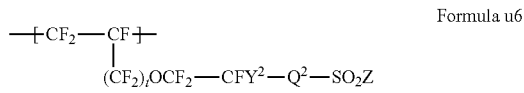

Formula u6

In the formula u6, $Q^2$, $Y^2$ and t are the same as $Q^2$, $Y^2$ and t as described for the units u3, and the preferred forms are also the same.

As the units u6, units u6-1 to u6-4 may be mentioned.

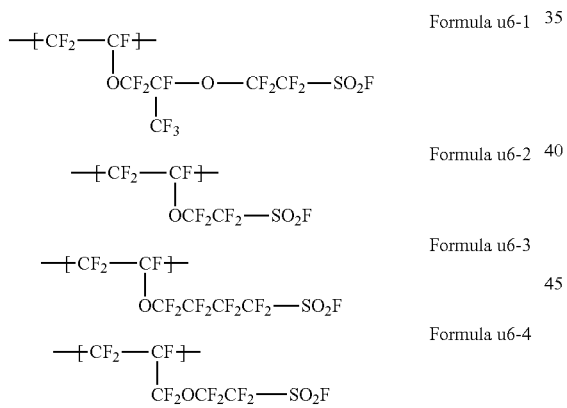

Formula u6-1

Formula u6-2

Formula u6-3

Formula u6-4

The proportions of the respective units in the polymer F may be suitably determined depending on the characteristics and physical properties (hydrogen gas permeability, hot water resistance, ion exchange capacity, conductivity, mechanical strength, elastic modulus, softening temperature, etc.) required for the polymer H.

The TQ value of the polymer F is preferably from 190 to 350° C., more preferably from 200 to 340° C., further preferably from 210 to 330° C.

When the TQ value of the polymer F is at least the lower limit value in the above range, the polymer H has a sufficient molecular weight and is excellent in mechanical strength. When the TQ value of the polymer F is at most the upper limit value in the above range, the solubility or dispersibility of the polymer H will be improved, and a liquid composition can be easily prepared. The TQ value is an index for the molecular weight of the polymer, and the higher the TQ value, the larger the molecular weight of the polymer.

The polymer F having the units u4 can be produced, for example, by polymerizing a monomer component containing compound 7 which will be described later, and, as the case requires, TFE and a monomer other than the compound 7 and TFE.

The polymerization method may, for example, be a bulk polymerization method, a solution polymerization method, a suspension polymerization method, or an emulsion polymerization method. Otherwise, the polymerization may be conducted in a liquid or supercritical carbon dioxide.

The polymerization is carried out under the condition that radicals are generated. The method for generating radicals may be a method of irradiating radiation such as ultraviolet rays, γ-rays or electron beams, a method of adding a radical initiator, etc. The polymerization temperature is preferably from 10 to 170° C.

Compound 7 can be used in the production of the polymer F having the units u4.

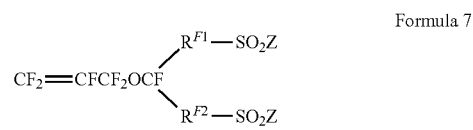

Formula 7

In the formula 7, $R^{F1}$ and $R^{F2}$ are the same as $R^{F1}$ and $R^{F2}$ as described for the units u1, and the preferred forms are also the same.

The compound 7 may, for example, be compound 7-1.

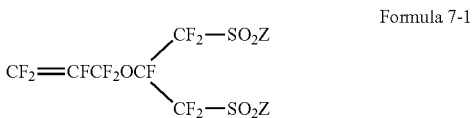

Formula 7-1

The compound 7 can be produced, for example, as follows.

Compound 1 is reacted with a sulfonating agent to obtain compound 2.

The compound 2 is reacted with a chlorinating agent to obtain compound 3.

The compound 3 is reacted with a fluorinating agent to obtain compound 4.

The compound 4 is subjected to fluorination treatment to obtain compound 5.

The compound 5 is reacted with a perfluoroallylating agent (for example, compound 6 as described later) to obtain the compound 7.

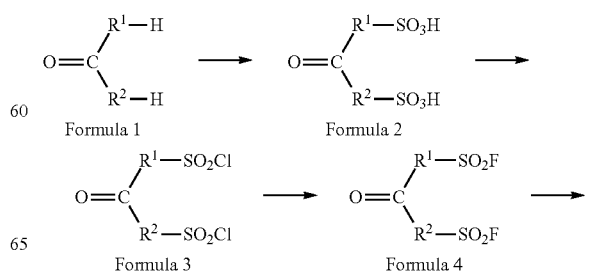

Formula 1    Formula 2

Formula 3    Formula 4

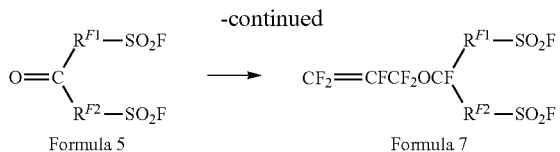

Formula 5 → Formula 7

In the formulas 1 to 4, $R^1$ and $R^2$ are each a $C_{1-3}$ alkylene group. $R^1$ and $R^2$ may be the same or different.

In the formulas 5 and 7, $R^{F1}$ and $R^{F2}$ are the same as $R^{F1}$ and $R^{F2}$ as described for the units u1, and the preferred forms are also the same.

As $R^1$ and $R^2$, for example, —CH$_2$—, —CH$_2$CH$_2$—, —CH(CH$_3$)—, —CH$_2$CH$_2$CH$_2$—, —CH(CH$_2$CH$_3$)—, —CH(CH$_3$)CH$_2$—, —CH$_2$CH(CH$_3$)— or —C(CH$_3$)(CH$_3$)— may be mentioned. $R^1$ and $R^2$ are each preferably a $C_{1-2}$ alkylene group, from such a viewpoint that the raw material compound 1 is cheaper, production of the compound 7 is easy, and the ion exchange capacity of the polymer H can be made higher. In the case of $C_2$, a straight chain is preferred. Specifically, —CH$_2$—, —CH$_2$CH$_2$— or —CH(CH$_3$)— is preferred, and —CH$_2$— is more preferred.

The compound 1 may, for example, be acetone, methyl ethyl ketone, diethyl ketone, methyl propyl ketone, ethyl propyl ketone, dipropyl ketone, diisopropyl ketone, isopropyl methyl ketone, isopropyl ethyl ketone or isopropyl propyl ketone. Acetone is preferred from such a viewpoint that the compound 1 is cheaper, production of the compound 7 is easy, and the ion exchange capacity of the polymer H per unit molecular weight can be made higher.

The sulfonating agent may, for example, be chlorosulfonic acid, fluorosulfonic acid, sulfur trioxide, a complex of sulfur trioxide, fuming sulfuric acid, or concentrated sulfuric acid.

The reaction temperature of the compound 1 and the sulfonating agent is preferably from 0 to 100° C. The reaction solvent can be suitably selected from solvents which are less likely to be sulfonated themselves. As the reaction solvent, for example, methylene chloride, chloroform, carbon tetrachloride, 1,1,1-trichloromethane, cyclohexane, hexane, petroleum ether, pentane, heptane, diethyl ether or acetonitrile may be mentioned. As the reaction solvent, two or more types may be used as mixed.

The chlorinating agent may, for example, be thionyl chloride, phosphorus pentachloride, phosphorus trichloride, phosphoryl chloride, chlorosulfonic acid, sulfuryl chloride, oxalyl chloride or chlorine.

The reaction temperature of the compound 2 and the chlorinating agent is preferably from 0 to 100° C. When the reaction temperature is at most the upper limit value in the above range, decomposition of the compound 3 can be suppressed, whereby the yield of the compound 3 is improved. When the reaction temperature is at least the lower limit value in the above range, the reaction rate is increased, whereby the productivity is improved.

The fluorinating agent may, for example, be potassium hydrogen fluoride, sodium hydrogen fluoride, potassium fluoride, sodium fluoride, cesium fluoride, silver fluoride, a quaternary ammonium fluoride (tetraethylammonium fluoride, tetrabutylammonium fluoride, etc.), hydrogen fluoride, hydrofluoric acid or a hydrogen fluoride complex (HF-pyridine complex, HF-triethylamine, etc.).

The reaction temperature of the compound 3 and the fluorinating agent is preferably from −30 to 100° C. The reaction solvent can be suitably selected from polar solvents or low polar solvents that are less susceptible to the fluorination reaction. The reaction solvent may, for example, be methylene chloride, chloroform, carbon tetrachloride, 1,1,1-trichloromethane, diethyl ether, dioxane, tetrahydrofuran, dimethoxyethane, diethylene glycol dimethyl ether, tetraethylene glycol dimethyl ether, dimethyl sulfoxide, sulfolane, N,N-dimethylformamide, acetonitrile, dimethyl carbonate, diethyl carbonate, ethylene carbonate, propylene carbonate or water. As the reaction solvent, two or more types may be used as mixed.

The fluorination treatment is carried out by bringing the compound 4 into contact with a fluorine gas or a fluorine compound.

As the fluorine compound, for example, hydrogen fluoride, a halogen fluoride (chlorine trifluoride, iodine pentafluoride, etc.), a gaseous fluoride (boron trifluoride, nitrogen trifluoride, phosphorus pentafluoride, silicon tetrafluoride, sulfur hexafluoride, etc.), a metal fluoride (lithium fluoride, nickel (II) fluoride, etc.), a hypofluorite compound (trifluoromethylhypofluorite, trifluoroacetylhypofluorite, etc.), or an electrophoretic fluorination reaction reagent (Selectfluor (registered trademark), N-fluorobenzenesulfonimide, etc.) may be mentioned.

As the fluorination treatment, a treatment in which the compound 4 and fluorine gas are brought into contact with each other is preferred from such a viewpoint that handling is easy, and impurities contained in the compound 5 are reduced. Fluorine gas may be diluted with an inert gas such as nitrogen gas before use. The temperature of the fluorination treatment is preferably from −20 to 350° C. The reaction solvent can be suitably selected from solvents which have high solubility of the compound 4 or the compound 5 and which are less likely to be susceptible to the fluorination treatment themselves. The reaction solvent may, for example, be acetonitrile, chloroform, dichloromethane, trichlorofluoromethane, a perfluorotrialkylamine (perfluorotributylamine, etc.), a perfluorocarbon (perfluorohexane, perfluorooctane, etc.), a hydrofluorocarbon (1H,4H-perfluorobutane, 1H-perfluorohexane, etc.), a hydrochlorofluorocarbon (3,3-dichloro-1,1,1,2,2-pentafluoropropane, 1,3-dichloro-1,1,2,2,3-pentafluoropropane, etc.), or a hydrofluoroether (CF$_3$CH$_2$OCF$_2$CF$_2$H, etc.).

Further, in the presence of hydrogen fluoride (HF), the compound 5 may be in equilibrium with an alcohol form in which hydrogen fluoride is added to the O=C< portion to form HO—CF<, or may become an alcohol form. In the present specification, even if it is simply described as the compound 5, it may represent one or both of the compound 5 and the alcohol form.

As the perfluoroallylating agent, for example, compound 6 may be mentioned.

    Formula 6

In the formula 6, G is —OSO$_2$F, —OSO$_2$R$^f$, a chlorine atom, a bromine atom or an iodine atom, and R$^f$ is a $C_{1-8}$ perfluoroalkyl group.

As the compound 6, compound 6-1 is preferred from the viewpoint of availability of raw materials, reactivity of the perfluoroallylating agent, ease of synthesis, and ease of handling.

    Formula 6-1

The compound 6-1 may be produced, for example, by reacting hexafluoropropylene with sulfur trioxide in the presence of boron trifluoride. Instead of boron trifluoride, a boron trifluoride diethyl ether complex or a Lewis acid such as trimethoxyborane may be used.

The reaction of the compound 5 with the perfluoroallylating agent is preferably carried out in the presence of a fluoride salt. The fluoride salt may, for example, be potassium fluoride, cesium fluoride, silver fluoride, quaternary ammonium fluoride or sodium fluoride.

The reaction temperature of the compound 5 and the perfluoroallylating agent is preferably from −70 to 40° C. The reaction solvent preferably contains an aprotic polar solvent, and more preferably consists of only an aprotic polar solvent. The aprotic polar solvent may, for example, be monoglime, diglime, triglime, tetraglime, acetonitrile, propionitrile, adiponitrile, benzonitrile, dioxane, tetrahydrofuran, N,N-dimethylformamide, dimethyl sulfoxide, N-methylpyrrolidone or nitroethane. As the reaction solvent, two or more types may be used as mixed.

The polymer F having units u5 and the polymer F having units u6 may be produced, for example, by the methods described in WO 2017/221840, WO 2018/012374, etc.

The hardly soluble cerium compound functions as a decomposition catalyst for hydrogen peroxide or peroxide radicals.

The average particle size of the hardly soluble cerium compound is from 1 nm to 3,000 nm, preferably from 1 nm to 400 nm. The upper limit value of the average particle size is preferably 2,500 nm, more preferably 1,800 nm, further preferably 1,000 nm, most preferably 400 nm. The lower limit value of the average particle size is preferably 5 nm, more preferably at least 10 nm, further preferably at least 20 nm.

When the average particle size of the hardly soluble cerium compound is at least the lower limit value in the above range, aggregation of the hardly soluble cerium compound is suppressed, whereby it is easy to obtain a stable dispersed state. When the average particle size of the hardly soluble cerium compound is at most the upper limit value in the above range, it has a sufficient surface area to reduce hydrogen peroxide or peroxide radicals, and defects such as breakage of the polymer electrolyte membrane are reduced.

The ratio of the total number of moles of cerium atoms in the hardly soluble cerium compound to the total number of moles of sulfonic acid groups contained in the polymer H is from 0.001 to 0.3, preferably from 0.001 to 0.17, more preferably from 0.003 to 0.07, further preferably from 0.003 to 0.035.

When the ratio of the total number of moles of cerium atoms is at least the lower limit value in the above range, deterioration of the membrane due to hydrogen peroxide or peroxide radicals can be reduced, and durability of the polymer electrolyte membrane obtainable from the liquid composition will be improved. When the ratio of the total number of moles of cerium atoms is at most the upper limit value in the above range, the sedimentation rate becomes small, whereby the hardly soluble cerium compound can be easily dispersed in the liquid composition.

The hardly soluble cerium compound may, for example, be cerium phosphate, cerium oxide, cerium hydroxide, cerium fluoride, cerium oxalate, cerium tungstate or a cerium salt of heteropolyacid. Among these, at least one type selected from the group consisting of cerium phosphate, cerium oxide, cerium fluoride, cerium tungstate and a cerium salt of heteropolyacid is preferred from the viewpoint of a high effect of suppressing deterioration of the polymer H due to hydrogen peroxide or peroxide radicals.

Cerium oxide is particularly preferred since it is excellent in dispersibility when added to the liquid composition of the present invention. Cerium oxide may be doped with polyvalent metal ions. The polyvalent metal ions may, for example, be zirconium, praseodymium, etc.

It is preferred that the liquid composition of the present invention further contains cerium ions. When the liquid composition further contains cerium ions, deterioration due to hydrogen peroxide or peroxide radicals is more likely to be suppressed in the polymer electrolyte membrane obtainable from the liquid composition. Therefore, a high output voltage can be maintained for a long period of time when made into a membrane electrode assembly.

The cerium ions may be cerium ions generated by the dissociation equilibrium of the hardly soluble cerium compound, or may be cerium ions generated from a water-soluble cerium salt. The cerium ions may be +3 valent or +4 valent.

The water-soluble cerium salt may, for example, be cerium carbonate, cerium acetate, cerium chloride, cerium nitrate, cerium sulfate, diammonium cerium nitrate, tetraammonium cerium sulfate, etc. Among these, cerium carbonate is preferred since carbonic acid can be easily removed as a gas.

The organic metal complex salt of cerium may, for example, be cerium acetylacetonate, etc.

The liquid composition can be produced, for example, by the following method 1 and method 2.
  Method 1: A method of mixing a composition containing a liquid medium and the polymer H with particles of a hardly soluble cerium compound.
  Method 2: A method of mixing a composition containing a liquid medium and the polymer H, and a dispersion liquid having a hardly soluble cerium compound dispersed in a liquid medium.

In the method 2, a composition consisting of a liquid medium and the polymer H may be added to a dispersion of a hardly soluble cerium compound, followed by mixing.

As a method for producing a liquid composition, the method 2 is preferred from such a viewpoint that it is possible to mix a hardly soluble cerium compound having a small particle size, and it is possible to obtain a liquid composition excellent in dispersion stability. The reason for this is that when the liquid medium, the polymer H, and the hardly soluble cerium compound are mixed at the same time, it is difficult to sufficiently crush fine particles of the hardly soluble cerium compound, and the hardly soluble cerium compound having a large particle diameter is likely to be present in the liquid composition and in the polymer electrolyte membrane.

As a mixing method in the method 2, for example, a method may be mentioned, in which under atmospheric pressure or in a state of being sealed in an autoclave, a composition containing a liquid medium and the polymer H is gradually added while stirring a dispersion of a hardly soluble cerium compound.

The temperature at the time of mixing is preferably from 0 to 80° C., more preferably from 0 to 30° C. If necessary, shearing such as ultrasonic waves may be applied.

(Advantageous Effects)

In the liquid composition of the present invention as described above, the ratio of the total number of moles of cerium atoms in the hardly soluble cerium compound to the total number of moles of sulfonic acid groups contained in the polymer H is at most 0.3, whereby in the polymer electrolyte membrane obtainable from the liquid composition, cerium ions to be formed by the dissociation equilibrium of the hardly soluble cerium compound are less likely to be excessively generated. Further, since the cerium compound is hardly soluble, it is less likely for cerium ions to move from the polymer electrolyte membrane to the catalyst layers after the production of the membrane electrode assembly, and it is possible to suppress ion exchange with ion exchange groups of the ion exchange resin in the catalyst layers.

In addition, since the ion exchange capacity of the polymer H is at least 1.36 meq/g, the polymer electrolyte membrane has high proton conductivity even under high temperature and low humidification conditions, and shows high power generation characteristics when used as an electrolyte membrane for a polymer electrolyte fuel cell. Therefore, according to the liquid composition of the present invention, it is possible to form a polymer electrolyte membrane, whereby the initial power generation characteristics are improved when made into a membrane electrode assembly.

Further, since the liquid composition of the present invention contains a hardly soluble cerium compound, and the ratio of the total number of moles of cerium atoms in the hardly soluble cerium compound to the total number of moles of sulfonic acid groups contained in the polymer H is at least 0.001, deterioration of the membrane due to hydrogen peroxide or peroxide radicals can be reduced, and the durability of the polymer electrolyte membrane is improved.

Further, in the liquid composition of the present invention, since the average particle size of the hardly soluble cerium compound is at most 3,000 nm, defects such as breakage of the polymer electrolyte membrane are less likely to occur.

<Polymer Electrolyte Membrane>

The polymer electrolyte membrane of the present invention is a membrane containing the polymer H and a hardly soluble cerium compound. The sulfonic acid groups of the polymer H in the polymer electrolyte membrane are preferably an acid type. The details and preferred forms of the polymer H and the hardly soluble cerium compound are the same as the contents as described for the liquid composition of the present invention.

The thickness of the polymer electrolyte membrane is preferably from 2 to 200 μm, more preferably from 5 to 130 μm. When the thickness of the polymer electrolyte membrane is at most the upper limit value in the above range, the membrane resistance can be sufficiently lowered. When the thickness of the polymer electrolyte membrane is at least the lower limit value in the above range, the permeability of hydrogen gas becomes sufficiently low.

The polymer electrolyte membrane may be reinforced with a reinforcing material. The reinforcing material may, for example, be porous materials, fibers, woven fabrics, or non-woven fabrics. The material for the reinforcing material may, for example, be polytetrafluoroethylene, a copolymer having TFE units and hexafluoropropylene units, a copolymer having TFE units and a perfluoro(alkyl vinyl ether) units, polyethylene, polypropylene, or polyphenylene sulfide.

The polymer electrolyte membrane may contain silica or a heteropolyacid (zirconium phosphate, phosphomolybdic acid, phosphotungstic acid, etc.) as a water retention agent for preventing drying.

The polymer electrolyte membrane can be formed, for example, by a method (cast method) in which the liquid composition of the present invention is applied to the surface of a base film or a catalyst layer, followed by drying. When the polymer electrolyte membrane further contains a reinforcing material, the polymer electrolyte membrane can be formed, for example, by impregnating the reinforcing material with the liquid composition of the present invention and drying it.

It is preferred to perform heat treatment in order to stabilize the polymer electrolyte membrane. The heat treatment temperature is preferably from 130 to 200° C., although it may depend on the type of polymer H. When the heat treatment temperature is at least 130° C., the polymer H will not contain excessive water. When the heat treatment temperature is at most 200° C., the thermal decomposition of the sulfonic acid groups is suppressed, and a decrease in the conductivity of the polymer electrolyte membrane is suppressed.

The polymer electrolyte membrane may be treated with hydrogen peroxide solution, as the case requires.

(Advantageous Effects)

The polymer electrolyte membrane of the present invention as described above contains the polymer H and a hardly soluble cerium compound, and the ratio of the total number of cerium atoms in the hardly soluble cerium compound to the total number of moles of sulfonic acid groups contained in the polymer H, is at most 0.3, whereby cerium ions to be formed by the dissociation equilibrium of the hardly soluble cerium compound will not be excessively generated. Further, since the cerium compound is hardly soluble, it is less likely for cerium ions to move from the polymer electrolyte membrane to the catalyst layers after the production of the membrane electrode assembly, whereby it is possible to suppress ion exchange with the ion exchange groups of the ion exchange resin in the catalyst layers.

In addition, since the ion exchange capacity of the polymer H is at least 1.36 meq/g, the polymer electrolyte membrane of the present invention has high proton conductivity even under high temperature and low humidification conditions, and shows high power generation characteristics when used as an electrolyte membrane for a polymer electrolyte fuel cell. Therefore, according to the polymer electrolyte membrane of the present invention, when made into a membrane electrode assembly, the initial power generation characteristics are improved.

Further, since the polymer electrolyte membrane of the present invention contains a hardly soluble cerium compound, and the ratio of the total number of moles of cerium atoms in the hardly soluble cerium compound to the total number of moles of sulfonic acid groups contained in the polymer H is at least 0.001, deterioration of the membrane due to hydrogen peroxide or peroxide radicals can be reduced, and durability is improved.

Further, in the polymer electrolyte membrane of the present invention, since the average particle size of the hardly soluble cerium compound is at most 3,000 nm, defects such as breakage are less likely to occur.

<Membrane Electrode Assembly>

FIG. 1 is a cross-sectional view showing an example of the membrane electrode assembly of the present invention. The membrane electrode assembly 10 comprises an anode 13 having a catalyst layer 11 and a gas diffusion layer 12, a cathode 14 having a catalyst layer 11 and a gas diffusion layer 12, and a polymer electrolyte membrane 15 which is disposed between the anode 13 and the cathode 14 in a state of being contact with the catalyst layers 11.

The catalyst layer 11 is a layer containing a catalyst and a polymer having ion exchange groups.

The catalyst may, for example, be a supported catalyst in which platinum or a platinum alloy is supported on a carbon carrier.

The carbon carrier may be carbon black powder.

The polymer having ion exchange groups may, for example, be the polymer H or a perfluoropolymer having ion exchange groups other than the polymer H.

The gas diffusion layer 12 has a function to uniformly diffuse gas into the catalyst layer 11 and a function as a current collector. The gas diffusion layer 12 may, for example, be carbon paper, carbon cloth, carbon felt or the like. The gas diffusion layer 12 is preferably treated for water-repellency with polytetrafluoroethylene or the like.

The polymer electrolyte membrane 15 is the polymer electrolyte membrane of the present invention.

As shown in FIG. 2, the membrane electrode assembly 10 may have a carbon layer 16 between the catalyst layer 11 and the gas diffusion layer 12.

By disposing the carbon layer 16, gas diffusivity on the surface of the catalyst layer 11 will be improved, and the power generation characteristics of the polymer electrolyte fuel cell will be substantially improved.

The carbon layer 16 is a layer containing carbon and a nonionic fluorinated polymer.

The carbon may, for example, be carbon particles, carbon fibers, etc. and carbon nanofibers having a fiber diameter of from 1 to 1,000 nm and a fiber length of at most 1,000 μm are preferred. The nonionic fluorinated polymer may, for example, be polytetrafluoroethylene.

In a case where the membrane electrode assembly 10 does not have a carbon layer 16, the membrane electrode assembly 10 is produced, for example, by the following methods.

A method in which catalyst layers 11 are formed on a polymer electrolyte membrane 15 to form a membrane catalyst layer assembly, and the membrane catalyst layer assembly is sandwiched between gas diffusion layers 12.

A method in which a catalyst layer 11 is formed on a gas diffusion layer 12 to obtain electrodes (anode 13 and cathode 14), and a polymer electrolyte membrane 15 is sandwiched between the electrodes.

In a case where the membrane electrode assembly 10 has carbon layers 16, the membrane electrode assembly 10 is produced, for example, by the following methods.

A method in which on a base film, a dispersion liquid containing carbon and a nonionic fluorinated polymer is applied and dried to form a carbon layer 16, a catalyst layer 11 is formed on the carbon layer, and the catalyst layers 11 and the polymer electrolyte membrane 15 are bonded, then the base film is peeled off to form a membrane catalyst layer assembly having carbon layers 16, and the membrane catalyst layer assembly is sandwiched between gas diffusion layers 12.

A method in which on a gas diffusion layer 12, a dispersion liquid containing carbon and a nonionic fluorinated polymer is applied and dried to form a carbon layer 16, and a membrane catalyst layer assembly having catalyst layers 11 formed on a polymer electrolyte membrane 15, is sandwiched by gas diffusion layers 12 having the carbon layer 16.

The method for forming the catalyst layer 11 may, for example, be the following methods.

A method in which a coating liquid for forming a catalyst layer is applied on a polymer electrolyte membrane 15, a gas diffusion layer 12, or a carbon layer 16 and dried.

A method in which a coating liquid for forming a catalyst layer is applied on a base film and dried to form a catalyst layer 11, and the catalyst layer 11 is transferred onto a polymer electrolyte membrane 15.

The coating liquid for forming a catalyst layer is a liquid in which a polymer having ion exchange groups and a catalyst are dispersed in a dispersion medium. The coating liquid for forming a catalyst layer can be prepared, for example, by mixing a liquid composition containing a polymer having ion exchange groups, and a dispersion liquid of the catalyst. The coating liquid for forming a catalyst layer may contain at least one type of metal, a metal compound, or a metal ion selected from the group consisting of cerium and manganese in order to further improve the durability of the catalyst layer 11.

Since the membrane electrode assembly 10 as described above is provided with the polymer electrolyte membrane of the present invention, it is excellent in initial power generation characteristics. Further, since it is provided with the polymer electrolyte membrane of the present invention excellent in durability, stable power generation becomes possible over a long period of time.

<Polymer Electrolyte Fuel Cell>

The polymer electrolyte fuel cell of the present invention is provided with the membrane electrode assembly of the present invention.

The polymer electrolyte fuel cell of the present invention may be one in which separators having grooves formed as gas flow paths, are disposed on both sides of the membrane electrode assembly. The separators may, for example, be separators made of various conductive materials, such as metal separators, carbon separators, and separators made of a material obtained by mixing graphite and a resin.

In a polymer electrolyte fuel cell, power generation is carried out by supplying a gas containing oxygen to the cathode and a gas containing hydrogen to the anode. The membrane electrode assembly can be applied also to a methanol fuel cell in which the power generation is carried out by supplying methanol to the anode.

Since the polymer electrolyte fuel cell of the present invention is provided with the membrane electrode assembly of the present invention, it is excellent in initial power generation characteristics. And, since it is provided with the polymer electrolyte membrane of the present invention excellent in durability, stable power generation is possible over a long period of time.

EXAMPLES

Hereinafter, the present invention will be specifically described with reference to Examples, but the present invention is not limited to these Examples.

Ex. 1 to Ex. 6 are Production Examples, Ex. 7-1 to Ex. 7-13 are Comparative Examples, and Ex. 7-14 to Ex. 7-25 are Examples of the present invention.

($^1$H-NMR)

$^1$H-NMR was measured under the conditions of frequency: 300.4 MHz and chemical shift standard: tetramethylsilane. Unless otherwise specified, CD$_3$CN was used as the solvent. The quantification of a product was carried out from the analysis result of $^1$H-NMR and the amount of the internal standard sample (1,3-bis(trifluoromethyl)benzene) added.

($^{19}$F-NMR)

$^{19}$F-NMR was measured under the conditions of frequency: 282.7 MHz, solvent: CD$_3$CN, and chemical shift standard: CFCl$_3$. The quantification of a product was carried out from the analysis result of $^{19}$F-NMR and the amount of the internal standard sample (1,3-bis(trifluoromethyl)benzene) added.

($^{13}$C-NMR)

$^{13}$C-NMR was measured under the conditions of frequency: 75.5 MHz and chemical shift standard: tetramethylsilane. Unless otherwise specified, CD$_3$CN was used as the solvent.

(Yield)

Yield means the yield of the reaction step×the yield of the purification step. The reaction yield means the yield of the reaction step before purifying the target product, which does not include the loss of the purification step.

(Ion Exchange Capacity)

The polymer F membrane was vacuum-dried at 120° C. for 12 hours. After measuring the mass of the membrane of the polymer after drying, the membrane of the polymer was immersed in a 0.85 mol/g sodium hydroxide solution (solvent: water/methanol=10/90 (mass ratio)) at 60° C. for at least 72 hours to hydrolyze the fluorosulfonyl groups. The ion exchange capacity of the polymer F was obtained by back-titration of the sodium hydroxide solution after the hydrolysis with 0.1 mol/L hydrochloric acid. The ion exchange capacity of the polymer H is the same as the ion exchange capacity of the polymer F.

(Average Particle Size of Hardly Soluble Cerium Compound)

In a case where at the time of the production of the liquid composition, a dispersion in which the hardly soluble cerium compound was dispersed in a liquid medium, was to be used, sample 1 was prepared by the following method, and the average particle size of the hardly soluble cerium compound was obtained. First, sample 1 was adjusted by diluting a dispersion of a hardly soluble cerium compound with ultrapure water so that a proper scattering intensity can be obtained for measuring the average particle size. Next, with respect to sample 1, the scattering intensity was measured by using a fiber optical dynamic light scattering photometer (FDLS-3000, manufactured by Otsuka Electronics Co., Ltd.) under the conditions of temperature: 25° C., sampling time: 50 μs, number of channels: 1024, and number of integrations: 100 times, and from the obtainable autocorrelation function, the average particle size was calculated by the cumulant method analysis to obtain the average particle size of the hardly soluble cerium compound.

In a case where at the time of the production of the liquid composition, particles of the hardly soluble cerium compound were used, sample 2 was prepared by the following method, and the average particle size of the hardly soluble cerium compound was obtained. First, the hardly soluble cerium compound, the polymer H and the liquid medium were mixed and subjected to dispersion treatment to prepare sample 2 composed of the hardly soluble cerium compound, the polymer H and the liquid medium. Next, sample 2 was measured by a laser diffraction/scattering type particle size distribution analyzer (MT3300EXII, manufactured by MicrotracBEL), and d50 of the obtained particle size distribution was taken as the average particle size of the hardly soluble cerium compound.

(Proportions of the Respective Units)

The proportions of the respective units in the polymer F were calculated from the ion exchange capacity of the polymer F.

The proportions of the respective units in the polymer H correspond to the proportions of the respective units in the polymer F and are therefore omitted.

(TQ Value)

Using a flow tester (CFT-500D, manufactured by Shimadzu Corporation) equipped with a nozzle with a length of 1 mm and an inner diameter of 1 mm, polymer F was melt-extruded while changing the temperature under the condition of an extrusion pressure of 2.94 MPa (gauge pressure). The extrusion amount of the polymer F was measured at different temperatures, and the temperature at which the extrusion amount was 100 mm$^3$/sec was taken as the TQ value.

(Initial Power Generation Characteristics)

A membrane electrode assembly was incorporated into a cell for power generation, and while the temperature of the membrane electrode assembly was maintained at 95° C., hydrogen gas (utilization rate 70%) was supplied to the anode, and oxygen gas (utilization rate 50%) was supplied to the cathode, as pressurized to 151 kPa (absolute pressure). The humidification of the gas was 20% RH relative humidity for both hydrogen gas and oxygen gas, and the cell voltage at the time when the current density was 1 A/cm$^2$ was recorded and evaluated in accordance with the following standards.

⊚: The cell voltage is at least 0.65 V.

◯: The cell voltage is at least 0.60 V and less than 0.65 V.

×: The cell voltage is less than 0.60 V.

× ×: Breakage is observed in at least a part of the polymer electrolyte membrane after preparation, whereby evaluation is impossible.

(Durability)

A membrane electrode assembly was incorporated into a cell for power generation, and as an acceleration test, an open circuit voltage test was carried out. In the test, hydrogen gas (utilization rate 70%) and oxygen gas (utilization rate 40%) corresponding to a current density of 0.2 A/cm$^2$ were, respectively, supplied to the anode and cathode at normal pressure, and while maintaining the cell temperature to be 120° C. and the relative humidity of the hydrogen gas and the oxygen gas to be 20% RH, the change over time of the open circuit voltage was recorded and evaluated in accordance with the following standards.

⊚: The decrease in the open circuit voltage after 700 hours of operation is less than 50 mV as compared with the initial open circuit voltage.

◯: The decrease in the open circuit voltage after 500 hours of operation is less than 50 mV as compared to the initial open circuit voltage, but the decrease in the open circuit voltage after 700 hours of operation is at least 50 mV as compared with the initial open circuit voltage.

×: The decrease in the open circuit voltage after expiration of 500 hours is at least 50 mV as compared with the initial open circuit voltage.

× ×: Breakage is observed in at least a part of the polymer electrolyte membrane after preparation, whereby evaluation is impossible.

Abbreviations

PSVE: $CF_2\!\!=\!\!CFOCF_2CF(CF_3)OCF_2CF_2SO_2F$,

TFE: Tetrafluoroethylene,

P2SVE: $CF_2\!\!=\!\!CFOCF_2CF(CF_2OCF_2CF_2SO_2F)OCF_2CF_2SO_2F$,

PFtBPO: $(CF_3)_3COOC(CF_3)_3$,

V-601: $CH_3OC(O)C(CH_3)_2\!\!-\!\!N\!\!=\!\!N\!\!-\!\!C(CH_3)_2C(O)OCH_3$,

HCFC-225cb: $CClF_2CF_2CHClF$,

HCFC-141b: $CH_3CCl_2F$,

HFC-52-13p: $CF_3(CF_2)_5H$,

HFE-347pc-f: $CF_3CH_2OCF_2CF_2H$,

ETFE sheet: A film of a copolymer having ethylene units and TFE units (manufactured by AGC Inc., trade name: AFLEX 100N, thickness: 100 μm).

Ex. 1

Ex. 1-1

Into a Hastelloy autoclave having an internal volume of 230 mL, 123.8 g of PSVE, 35.2 g of HCFC-225cb and 63.6 mg of AIBN were put, cooled with liquid nitrogen and degassed. The temperature was raised to 70° C., TFE was introduced into the system, and the pressure was maintained at 1.14 MPaG. TFE was added continuously so that the pressure became constant at 1.14 MPaG. After expiration of 7.9 hours, when the amount of TFE added reached 12.4 g, the autoclave was cooled, and the gas in the system was purged to terminate the reaction. The polymer solution was diluted with HCFC-225cb, then HCFC-141b was added for aggregation. After washing with HCFC-225cb and HCFC-141b, the mixture was dried to obtain 25.1 g of polymer F-1, which is a copolymer having TFE units and PSVE units. The results are shown in Table 1.

Ex. 1-2 and Ex. 1-3

TFE and PSVE were copolymerized in the same manner as in Ex. 1-1 except that the conditions were changed as shown in Table 1, whereby polymers F-2 and F-3 were obtained. The results are shown in Table 1.

TABLE 1

|  | Ex. 1-1 | Ex. 1-2 | Ex. 1-3 |
| --- | --- | --- | --- |
| Reactor volume [mL] | 230 | 230 | 1,000 |
| SO$_2$F group-containing monomer | PSVE | PSVE | PSVE |
| Amount [g] of SO$_2$F group-containing monomer | 123.8 | 170.0 | 760.9 |
| HCFC-225cb [g] | 35.2 | — | — |
| HFC-52-13p [g] | — | 5.0 | 12.8 |
| Polymerization initiator | AIBN | V601 | V601 |
| Amount of polymerization initiator [mg] | 63.6 | 26.5 | 346.2 |
| Polymerization temperature [° C.] | 70 | 65 | 57 |
| Polymerization pressure [MPaG] | 1.14 | 1.10 | 0.765 |
| Diluting nitrogen partial pressure [MPa] | — | 0.20 | 0.12 |
| Polymerization time [hr.] | 7.9 | 7.0 | 6.7 |
| Obtained polymer F | F-1 | F-2 | F-3 |
| Yield of polymer F [g] | 25.1 | 24.5 | 68.7 |
| Units based on SO$_2$F group-containing monomer [mol %] | 17.7 | 22.0 | 25.9 |
| TFE units [mol %] | 82.3 | 78.0 | 74.1 |
| Ion exchange capacity [meq/g dry resin] | 1.10 | 1.25 | 1.38 |
| TQ value [° C.] | 223 | 227 | 228 |

Ex. 2

Into a stainless steel autoclave having an internal volume of 2,575 mL, 1,996.4 g of P2SVE was charged under reduced pressure, and degassed under reduced pressure at room temperature. After raising the temperature to 57° C., TFE was introduced until it reached 0.76 MPaG. After confirming that the pressure did not change, 9.29 g of the HFC-52-13p solution in which 400 mg of V601 was dissolved, was added under pressure with nitrogen gas, and the addition line was washed with 11.0 g of HFC-52-13p. While keeping the temperature and pressure to be constant, TFE was continuously supplied and polymerized. After 14.5 hours from the start of polymerization, the autoclave was cooled to stop the polymerization reaction, and the gas in the system was purged to obtain a solution of polymer F-4.

1,800 g of HFC-52-13p was added to the solution of polymer F-4, followed by mixing. The temperature of the polymer solution was 19° C. This polymer solution was added to 11.5 kg of HFE-347pc-f at 10° C. to aggregate the polymer F-4 to form particles. The liquid containing the particles of the polymer F-4 was filtered by using a filter paper (No. 4A manufactured by ADVANTEC). To the obtained polymer F-4 particles, 1,800 g of HFE-347pc-f was added, stirred and then washed by filtration. The washing operation was repeated 5 times. The particles of the obtained polymer F-4 were dried under reduced pressure at 140° C. overnight to obtain 339.7 g of the polymer F-4. The ion exchange capacity of the polymer F-4 was 1.95 meq/g, and the TQ value of the polymer F-4 was 236° C.

Ex. 3

Ex. 3-1

Into a 2 L four-necked flask equipped with a stirrer, a condenser, a thermometer and a dropping funnel, 560 g of chlorosulfonic acid was charged under nitrogen gas sealing. The flask was cooled in an ice bath, and a mixed solution of 139.5 g of compound 1-1 and 478.7 g of dichloromethane was added dropwise over 20 minutes while keeping the internal temperature to be at most 20° C. During the dropping, heat generation and gas generation were observed. After completion of the dropping, the flask was set in an oil bath, and the reaction was conducted for 7 hours while keeping the internal temperature at from 30 to 40° C. The reaction proceeded with the generation of gas, and a white solid was precipitated. After the reaction, the pressure inside the flask was reduced, and dichloromethane was distilled off. A yellowish white solid remained in the flask. When the solid was analyzed by $^1$H-NMR, it was confirmed that compound 2-1 was formed.

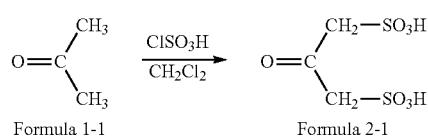

Formula 1-1    Formula 2-1

NMR spectrum of compound 2-1:
$^1$H-NMR (solvent: D$_2$O): 4.27 ppm (—CH$_2$—, 4H, s).
$^{13}$C-NMR (solvent: D$_2$O): 62.6 ppm (—CH$_2$—), 195.3 ppm (C═O).

Ex. 3-2

Compound 2-1 obtained in Ex. 3-1 was used as it was in the next reaction without being isolated. 2,049 g of thionyl chloride was added to the flask in Ex. 3-1. The flask was heated to 80° C. and refluxed for 15 hours. As the reaction proceeded, the reflux temperature increased from 52° C. to 72° C. Gas generation was confirmed during the reaction. The point at which compound 2-1 was completely dissolved and the generation of gas subsided was taken as the reaction end point. When the reaction solution was transferred to a 2 L separable flask and left to cool for 9 hours while sealing the gas phase part with nitrogen gas, a dark brown solid was precipitated in the separable flask. Unreacted thionyl chloride was removed by decantation. Toluene was added to wash the precipitated solid, and the toluene was removed again by decantation. Toluene washing was carried out a total of 3 times, and the total amount of toluene used was 1,207 g. The precipitated solid was dried at 25° C. for 71 hours under a nitrogen gas stream. The dried solid was recovered and analyzed by ¹H-NMR, and it was confirmed that 356.5 g of compound 3-1 having a purity of 96.2% was obtained. The yield based on compound 1-1 was 56.0%.

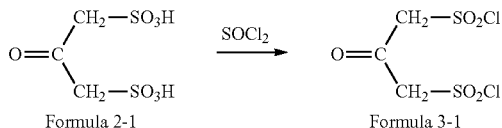 [SMILES: O=C(CS(=O)(=O)O)CS(=O)(=O)O ; "SOCl2" ; O=C(CS(=O)(=O)Cl)CS(=O)(=O)Cl]

Formula 2-1 → Formula 3-1

NMR spectrum of compound 3-1:
¹H-NMR: 5.20 ppm (—CH$_2$—, 4H, s).
¹³C-NMR: 72.3 ppm (—CH$_2$—), 184.6 ppm (C=O).

Ex. 3-3

Into a 1 L four-necked flask equipped with a stirrer, a condenser and a thermometer, 90.0 g of compound 3-1 and 750 mL of acetonitrile were charged under nitrogen gas sealing. The flask was cooled in an ice bath, and 110.3 g of potassium hydrogen fluoride was added with stirring. Heat generation associated with the addition was slight. The ice bath was changed to a water bath, and the reaction was carried out for 62 hours while maintaining the internal temperature at from 15 to 25° C. Along with the reaction, a fine white solid was formed. The reaction solution was transferred to a pressure filter, and unreacted potassium hydrogen fluoride and the product were separated by filtration. Acetonitrile was added to the filter, and the separated solid was washed until the filtrate became transparent, and the washing solution was recovered. Acetonitrile was distilled off by applying a filtrate and a washing solution to an evaporator. 950 mL of toluene was added to the solid remaining after drying, and the mixture was heated to 100° C. to dissolve the solid in toluene. The dissolved liquid was filtered by gravity filtration to remove undissolved components. When the filtrate was transferred to a 1 L separable flask and left to cool for 14 hours while sealing the gas phase part with nitrogen gas, light brown needle-like crystals were precipitated in the separable flask. The crystals were washed with toluene and dried at 25° C. for 30 hours under a nitrogen gas stream. When the dried solid was recovered and analyzed by ¹H-NMR and ¹⁹F-NMR, it was confirmed that 58.1 g of compound 4-1 having a purity of 97.6% was obtained. The yield based on compound 3-1 was 72.3%.

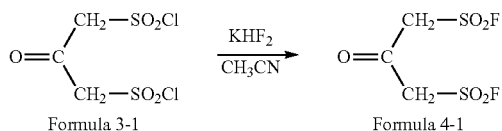 [SMILES: O=C(CS(=O)(=O)Cl)CS(=O)(=O)Cl ; "CH3CN" ; "KHF2" ; O=C(CS(=O)(=O)F)CS(=O)(=O)F]

Formula 3-1 → Formula 4-1

NMR spectrum of compound 4-1:
¹H-NMR: 4.97 ppm (—CH$_2$—, 4H, d, J=3.1 Hz).
¹⁹F-NMR: 62.4 ppm (—SO$_2$F, 2F, t, J=3.1 Hz).
¹³C-NMR: 60.7 ppm (—CH$_2$—), 184.9 ppm (C=O).

Ex. 3-4

Into a 200 mL nickel autoclave, 9.93 g of compound 4-1 and 89.7 g of acetonitrile were charged. The autoclave was cooled, nitrogen gas was fed at a flow rate of 6.7 L/hr, while maintaining the internal temperature at from 0 to 5° C., and the reaction solution was bubbled for 1 hour. While maintaining the temperature of the reaction solution at from 0 to 5° C., a mixed gas of fluorine gas and nitrogen gas (mixing ratio=10.3 mol %/89.7 mol %) was introduced at a flow rate of 6.7 L/hr for 6 hours. Nitrogen gas was fed again at a flow rate of 6.7 L/hr, and the reaction solution was bubbled for 1 hour. 103.2 g of the reaction solution was recovered from the autoclave. When the reaction solution was quantitatively analyzed by ¹⁹F-NMR, it was confirmed that the compound 5-1 was contained in an amount of 8.4 mass %. The reaction yield based on compound 4-1 was 66%.

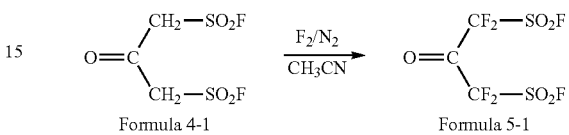

Formula 4-1 → Formula 5-1

NMR spectrum of compound 5-1:
¹⁹F-NMR: −104.1 ppm (—CF$_2$—, 4F, s), 45.8 ppm (—SO$_2$F, 2F, s).

Ex. 3-5

Into a 200 mL nickel autoclave, 19.9 g of compound 4-1 and 85.6 g of acetonitrile were charged. The autoclave was cooled, nitrogen gas was fed at a flow rate of 6.7 L/hr while maintaining the internal temperature at from 0 to 5° C., and the reaction solution was bubbled for 1 hour. While maintaining the temperature of the reaction solution at from 0 to 5° C., a mixed gas of fluorine gas and nitrogen gas (mixing ratio=10.3 mol %/89.7 mol %) was introduced at a flow rate of 16.4 L/hr over 6.5 hours. Nitrogen gas was fed again at a flow rate of 6.7 L/hr, and the reaction solution was bubbled for 1 hour. 109.6 g of the reaction solution containing compound 5-1 was recovered from the autoclave.

Ex. 3-6

Into a 200 mL nickel autoclave, 20.1 g of compound 4-1 and 80.1 g of acetonitrile were charged. The autoclave was cooled, nitrogen gas was fed at a flow rate of 6.7 L/hr while maintaining the internal temperature at from 0 to 5° C., and the reaction solution was bubbled for 1 hour. While maintaining the temperature of the reaction solution at from 0 to 5° C., a mixed gas of fluorine gas and nitrogen gas (mixing ratio=20.0 mol %/80.0 mol %) was introduced at a flow rate of 8.4 L/hr over 6 hours. Nitrogen gas was fed again at a flow rate of 6.7 L/hr, and the reaction solution was bubbled for 1 hour. 107.1 g of the reaction solution containing compound 5-1 was recovered from the autoclave.

Ex. 3-7

Into a 50 mL four-necked flask equipped with a stirrer, a condenser, a thermometer and a dropping funnel, 1.65 g of potassium fluoride and 7.8 mL of diethylene glycol dimethyl ether (diglyme) were charged. The flask was cooled in an ice bath and stirred, and while maintaining the internal temperature at from 0 to 10° C., 8.43 g of the reaction solution obtained in Ex. 3-4 was added dropwise by using a plastic syringe. Strong heat generation was confirmed, and it took 15 minutes for the dropping. After completion of the dropping, the ice bath was replaced by a water bath, and the reaction was carried out at from 15 to 20° C. for 1 hour. The mixture was cooled again in an ice bath, and 6.56 g of compound 6-1 was added dropwise from the dropping funnel while maintaining the temperature of the reaction solution at from 0 to 10° C. After completion of the dropping, the ice bath was replaced by a water bath and the reaction was conducted at from 20 to 25° C. for 3.5 hours. A by-product solid was removed from the reaction solution by suction filtration, and the filtrate was collected. The filtered residual solid was washed with an appropriate amount of acetonitrile, and the washing liquid was mixed with the filtrate. When 37.1 g of the filtrate was quantitatively analyzed by $^{19}$F-NMR, it was confirmed that compound 7-1 was contained in an amount of 2.04 mass %. The reaction yield based on compound 4-1 was 46.6%.

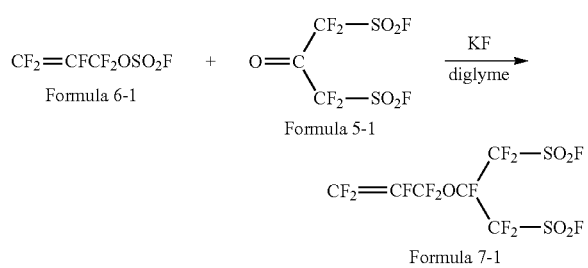

NMR spectrum of compound 7-1:
$^{19}$F-NMR: −191.5 ppm (CF$_2$=CF—, 1F, ddt, J=116, 38, 14 Hz), −133.8 ppm (—O—CF—, 1F, tt, J=21.3, 6.1 Hz), −103.1 ppm (—CF$_2$—SO$_2$F, 4F, m), −101.5 ppm (CF$_2$=CF—, 1F, ddt, J=116, 49, 27 Hz), −87.6 ppm (CF$_2$=CF—, 1F, ddt, J=49, 38, 7 Hz), −67.5 ppm (—CF$_2$—O—, 2F, m), 46.8 ppm (—SO$_2$F, 2F, s).

Ex. 3-8

Into a 500 mL four-necked flask equipped with a stirrer, a condenser, a thermometer and a dropping funnel, 36.6 g of potassium fluoride and 125.6 g of acetonitrile were charged. The flask was cooled in an ice bath and stirred to keep the internal temperature at from 0 to 10° C., and 79.8 g of the reaction solution obtained in Ex. 3-5 was added dropwise by using a plastic dropping funnel. Strong heat generation was confirmed, and it took 23 minutes for the dropping. After completion of the dropping, the ice bath was replaced by a water bath, and the reaction was carried out at from 20 to 30° C. for 5.5 hours. The mixture was cooled again in an ice bath, and 146.0 g of compound 6-1 was added dropwise from the dropping funnel while maintaining the temperature of the reaction solution at from 0 to 10° C. After completion of the dropping, the ice bath was replaced by a water bath and the reaction was conducted at from 15 to 25° C. for 16 hours. Suction filtration was performed in the same manner as in Ex. 3-7, and 412.3 g of the obtained filtrate was quantitatively analyzed by $^{19}$F-NMR, and it was confirmed that compound 7-1 was contained in an amount of 3.93 mass %. The reaction yield based on compound 4-1 was 55.9%. The filtrate was distilled under reduced pressure to isolate compound 7-1 as a fraction having a boiling point of 97.2° C./10 kPa. The gas chromatography purity was 98.0%.

Ex. 3-9

Into a 50 mL four-necked flask equipped with a stirrer, a condenser, a thermometer and a dropping funnel, 3.70 g of potassium fluoride and 10.9 g of acetonitrile were charged. The flask was cooled in an ice bath and stirred, and 10.2 g of the reaction solution obtained in Ex. 3-6 was added dropwise by using a plastic syringe while keeping the internal temperature at from 0 to 10° C. Strong heat generation was confirmed, and it took 8 minutes for the dropping. After completion of the dropping, the ice bath was replaced by a water bath, and the reaction was carried out at from 20 to 30° C. for 3 hours. The mixture was cooled again in an ice bath, and 14.6 g of compound 6-1 was added dropwise from the dropping funnel while maintaining the temperature of the reaction solution at from 0 to 10° C. After completion of the dropping, the ice bath was replaced by a water bath and the reaction was carried out at from 15 to 25° C. for 17 hours. Suction filtration was performed in the same manner as in Ex. 3-7, and 55.9 g of the obtained filtrate was quantitatively analyzed by $^{19}$F-NMR, and it was confirmed that compound 7-1 was contained in an amount of 4.77 mass %. The reaction yield based on compound 4-1 was 69.6%. The reaction yield based on compound 1-1 (reaction yield in the entire monomer synthesis step) was 28.2%.

Ex. 4

Into an autoclave (internal volume 100 mL, made of stainless steel), 70.0 g of compound 7-1 was put, cooled with liquid nitrogen and degassed. 2.53 g of TFE was introduced into the autoclave and heated in an oil bath until the internal temperature reached 100° C. The pressure at this time was 0.29 MPa (gauge pressure). A mixed solution of 36.3 mg of PFtBPO as a polymerization initiator and 2.58 g of HFC-52-13p, was injected into the autoclave. Furthermore, nitrogen gas was introduced from the injection line, and the injecting liquid in the injection line was completely pushed in. As a result of diluting TFE of the gas phase portion by this operation, the pressure increased to 0.56 MPa (gauge pressure). Polymerization was carried out by continuously adding TFE while maintaining the pressure at 0.56 MPa (gauge pressure). When the amount of TFE added reached 4.03 g in 9.5 hours, the inside of the autoclave was cooled to stop the polymerization, and the gas in the system was purged. The reaction mixture was diluted with HFC-52-13p, HFE-347pc-f was added, and the polymer was aggregated and filtered. Then, the operation of stirring the polymer in HFC-52-13p and reaggregating it with HFE-347pc-f, was repeated twice. Vacuum drying was conducted at 120° C. to obtain polymer F-5 which is a copolymer having TFE units and compound 7-1 units.

Ex. 5

Using the polymers F-1 to F-3 obtained in Ex. 1, membrane-form polymers H-1 to H-3 were obtained by the following method.
The polymer F was pressed at a temperature 10° C. higher than the TQ value and 4 MPa to prepare a membrane of the polymer F having a size of 30 mm×50 mm and a thickness of 100 to 200 μm. The membrane of the polymer F was immersed in an aqueous solution containing 20 mass % of potassium hydroxide at 80° C. for 16 hours to hydrolyze —SO$_2$F of the polymer F and convert it to —SO$_3$K. Further, the membrane of the polymer was immersed in a 3 mol/L hydrochloric acid aqueous solution for 2 hours. By replacing the aqueous hydrochloric acid solution, the same processing was repeated four more times, to convert —SO$_3$K to —SO$_3$H, to obtain a membrane form polymer H.
By using the polymer F-4 obtained in Ex. 2, in the same manner as the above-mentioned method, a membrane form polymer H-4 was produced, and by using the polymer F-5 obtained in Ex. 4, in the same manner as the above-mentioned method, a membrane form polymer H-5 was produced.

Ex. 6

Ex. 6-1

By using the membrane of the polymer H-1 obtained in Ex. 5, a polymer dispersion S-1 was prepared by the following method.

Into an autoclave (internal volume 200 mL, made of glass), 21 g of finely cut polymer H-1 membrane and 56.9 g of a mixed solvent of ethanol/water (60/40 (mass ratio)), were added, and the autoclave was heated with stirring. After stirring at 115° C. for 16 hours, the mixture was left to cool and subjected to filtering by using a pressure filter (filter paper: manufactured by ADVANTEC, PF040) to obtain 77.4 g of a polymer dispersion S-1 having the polymer H-1 dispersed in the mixed solvent.

Ex. 6-2 to 6-5

Polymer dispersions S-2 to S-5 were obtained in the same manner as in Ex. 6-1 except that the polymer used, the composition of the mixed solvent, and the stirring conditions were changed as shown in Table 2.

TABLE 2

|  | Ex. 6-1 | Ex. 6-2 | Ex. 6-3 | Ex. 6-4 | Ex. 6-5 |
| --- | --- | --- | --- | --- | --- |
| Polymer H used | H-1 | H-2 | H-3 | H-4 | H-5 |
| Obtained polymer dispersion S | S-1 | S-2 | S-3 | S-4 | S-5 |
| Ethanol/water [mass ratio] | 60/40 | 60/40 | 60/40 | 50/50 | 50/50 |
| Temperature [° C.] | 105 | 105 | 105 | 110 | 110 |
| Stirring time [hr.] | 6 | 6 | 6 | 25 | 25 |
| Solid content concentration [%] | 27 | 27 | 20 | 13 | 13.5 |

Ex. 7

Ex. 7-1, Ex. 7-6, Ex. 7-14, Ex. 7-18, Ex. 7-21

By using the polymer dispersions S-1 to S-5 obtained in Ex. 6, liquid compositions L-1, L-6, L-14, L-18 and L-21 in Ex. 7-1, 7-6, 7-14, 7-18 and 7-21 were prepared by the following method.

Cerium oxide particles (FUJIFILM Wako Pure Chemical Corporation, primary particle size <10 nm) were added to the polymer dispersions shown in Table 3, so that the ratio of the total number of moles of cerium atoms in cerium oxide to the total number of moles of sulfonic acid groups in the polymer H, became to be 0.033, and after adding zirconia beads having a diameter of 5 mm, dispersion treatment was conducted by mixing by a planetary bead mill at a rotation speed of 200 rpm for 60 minutes. When the prepared liquid composition was measured by using a laser diffraction/scattering type particle size distribution meter, the average particle size of cerium oxide was 2,300 nm.

Ex. 7-2, Ex. 7-7

By using the polymer dispersions S-1 and S-2 obtained in Ex. 6, liquid compositions L-2 and L-7 in Ex. 7-2 and Ex. 7-7 were prepared by the following method.

Cerium oxide particles (FUJIFILM Wako Pure Chemical Corporation, primary particle size <10 nm) were added to the polymer dispersions shown in Table 3, so that the ratio of the total number of moles of cerium atoms in cerium oxide to the total number of moles of sulfonic acid groups in the polymer H, became to be 0.033, and after adding zirconia beads having a diameter of 5 mm, dispersion treatment was conducted by mixing by a planetary bead mill at a rotation speed of 300 rpm for 60 minutes. When the prepared liquid composition was measured using a laser diffraction/scattering type particle size distribution meter, the average particle size of cerium oxide was 1,000 nm.

Ex. 7-3, Ex. 7-8, Ex. 7-15, Ex. 7-19, Ex. 7-22, Ex. 7-24

By using the polymer dispersions S-1 to S-5 obtained in Ex. 6, liquid compositions L-3, L-8, L-15, L-19, L-22 and L-24 in Ex. 7-3, 7-8, 7-15, 7-19, 7-22 and 7-24 were prepared by the following method.

Cerium oxide particles (Fujifilm Wako Pure Chemical Industries, Ltd., primary particle size <10 nm) were added to the polymer dispersions shown in Table 3, so that the ratio of the total number of moles of cerium atoms in cerium oxide to the total number of moles of sulfonic acid groups in the polymer H became to be the numerical value as shown in Table 3, and after adding zirconia beads having a diameter of 2 mm, dispersion treatment was conducted by mixing by a planetary bead mill at a rotation speed of 300 rpm for 60 minutes. When the prepared liquid composition was measured using a laser diffraction/scattering type particle size distribution meter, the average particle size of cerium oxide was 300 nm.

Ex. 7-4, Ex. 7-9, Ex. 7-16, Ex. 7-20, Ex. 7-23, Ex. 7-25

By using the polymer dispersions S-1 to S-5 obtained in Ex. 6, liquid compositions L-4, L-9, L-16, L-20, L-23 and L-25 in Ex. 7-4, 7-9, 7-16, 7-20, 7-23 and 7-25 were prepared by the following method.

When the average particle size of a cerium oxide aqueous dispersion (Sigma Aldrich, dispersant: acetic acid, cerium oxide average particle size 30-50 nm) was measured by a dynamic light scattering method, the average particle size of cerium oxide was 30 nm. While stirring this aqueous cerium oxide dispersion, the polymer dispersion shown in Table 3 was gradually added so that the ratio of the total number of moles of cerium atoms in cerium oxide to the total number of moles of sulfonic acid groups of the polymer H became to be the numerical value shown in Table 3.

Ex. 7-5, Ex. 7-10, Ex. 7-17

By using the polymer dispersions S-1 to S-3 obtained in Ex. 6, liquid compositions L-5, L-10 and L-17 in Ex. 7-5, 7-10 and 7-17 were prepared by the following method.

When the average particle size of the aqueous dispersion of cerium oxide (Sigma Aldrich, average particle size of cerium oxide <5 nm) was measured by a dynamic light scattering method, the average particle size of cerium oxide was 5 nm. While stirring this aqueous cerium oxide dispersion, the polymer dispersion shown in Table 3 was gradually added so that the ratio of the total number of moles of cerium atoms in cerium oxide to the total number of moles of sulfonic acid groups in the polymer H became to be 0.033.

Ex. 7-11

By using the polymer dispersion S-3 obtained in Ex. 6, liquid composition L-11 in Ex. 7-11 was prepared by the following method.

Cerium oxide particles (Fujifilm Wako Pure Chemical Industries, Ltd., primary particle size <10 nm) were added to the polymer dispersion S-3, so that the ratio of the total number of moles of cerium atoms in cerium oxide to the total number of moles of sulfonic acid groups in the polymer H-3 became to be 0.033, and after adding zirconia beads having a diameter of 5 mm, dispersion treatment was conducted by mixing by a planetary bead mill at a rotation speed of 200 rpm for 30 minutes. When the prepared liquid composition was measured by using a laser diffraction/scattering type particle size distribution meter, the average particle size of cerium oxide was 5,000 nm.

Ex. 7-12

By using the polymer dispersion S-3 obtained in Ex. 6, liquid composition L-12 in Ex. 7-12 was prepared by the following method.

Cerium carbonate hydrate ($Ce_2(CO_3)_3 \cdot 8H_2O$) was added to the polymer dispersion S-3 so that the ratio of the number of cerium atoms became to be 0.033 to the total number of moles of sulfonic acid groups in the polymer H-3, followed by stirring at 50° C. for 24 hours.

Ex. 7-13

The polymer dispersion S-3 obtained in Ex. 6 was used as it was as liquid composition L-13 in Ex. 7-13 without adding a cerium compound.

(Preparation of Polymer Electrolyte Membrane)

The liquid compositions L-1 to L-25 were, respectively, applied to the surface of an ETFE sheet by a die coater, dried at 80° C. for 15 minutes, and further heat-treated at 185° C. for 30 minutes, to obtain polymer electrolyte membranes having a thickness of 25 μm.

(Preparation of ETFE Sheet with Catalyst Layer)

The polymer H-1 and a mixed solvent of ethanol/water (60/40 (mass ratio)) were mixed to obtain a polymer H-1 dispersion with a solid content concentration of 25.8 mass %.

To 44 g of a supported catalyst (manufactured by TANAKA Kikinzoku Kogyo K.K.) in which 46 mass % of platinum was supported on carbon powder, 221.76 g of water and 174.24 g of ethanol were added, and the mixture was mixed and pulverized by using an ultrasonic homogenizer to obtain a dispersion of the catalyst. To the catalyst dispersion, 102.06 g of a mixed solution in which 80.16 g of the polymer H-1 dispersion, 44.4 g of ethanol and 25.32 g of ZEORORA H (manufactured by Zeon Corporation) were mixed and kneaded in advance, was added, and further, 26.77 g of water and 12 g of ethanol were added and mixed by using an ultrasonic homogenizer to adjust the solid content concentration to be 10 mass % to obtain a coating liquid for forming a catalyst layer. The coating liquid was applied to an ETFE sheet by a die coater, dried at 80° C. and further heat-treated at 160° C. for 30 minutes to form an ETFE sheet with a catalyst layer having a platinum content of 0.4 mg/cm².

81.6 g of ethanol and 154.4 g of distilled water were added to 50 g of vapor-grown carbon fiber (trade name: VGCF-H, manufactured by Showa Denko K. K.; fiber diameter of about 150 nm, fiber length of 10 to 20 μm) and stirred well. To this, 89 g of FLEMION (ion exchange capacity 1.1 meq/g, solid content concentration 28.1%) was added and stirred well, and further mixed and pulverized by using an ultrasonic homogenizer to prepare a coating liquid for forming an intermediate layer.

TABLE 3

| Liquid composition | Polymer dispersion | Ion exchange capacity [meq/g dry resin] | Average particle size of cerium oxide [nm] | Ratio of the total number of moles of cerium atoms | Initial power generation characteristics | Durability |
| --- | --- | --- | --- | --- | --- | --- |
| L-1 | S-1 | 1.1 | 2300 | 0.033 | X | ◯ |
| L-2 | S-1 | 1.1 | 1000 | 0.033 | X | ◯ |
| L-3 | S-1 | 1.1 | 300 | 0.033 | X | ◯ |
| L-4 | S-1 | 1.1 | 30 | 0.033 | X | ◯ |
| L-5 | S-1 | 1.1 | 5 | 0.033 | X | ◯ |
| L-6 | S-2 | 1.25 | 2300 | 0.033 | X | ◯ |
| L-7 | S-2 | 1.25 | 1000 | 0.033 | X | ◯ |
| L-8 | S-2 | 1.25 | 300 | 0.033 | X | ◯ |
| L-9 | S-2 | 1.25 | 30 | 0.033 | X | ◯ |
| L-10 | S-2 | 1.25 | 5 | 0.033 | X | ◯ |
| L-11 | S-3 | 1.38 | 5000 | 0.033 | XX | XX |
| L-12 | S-3 | 1.38 | — | — | X | ◯ |
| L-13 | S-3 | 1.38 | — | — | ◯ | X |
| L-14 | S-3 | 1.38 | 2300 | 0.033 | ◯ | ◯ |
| L-15 | S-3 | 1.38 | 300 | 0.033 | ◯ | ◉ |
| L-16 | S-3 | 1.38 | 30 | 0.033 | ◯ | ◉ |
| L-17 | S-3 | 1.38 | 5 | 0.033 | ◯ | ◯ |
| L-18 | S-4 | 1.95 | 2300 | 0.033 | ◯ | ◯ |
| L-19 | S-4 | 1.95 | 300 | 0.033 | ◉ | ◉ |
| L-20 | S-4 | 1.95 | 30 | 0.033 | ◉ | ◉ |
| L-21 | S-5 | 1.87 | 2300 | 0.033 | ◯ | ◯ |
| L-22 | S-5 | 1.87 | 300 | 0.033 | ◉ | ◉ |
| L-23 | S-5 | 1.87 | 30 | 0.033 | ◉ | ◉ |
| L-24 | S-4 | 1.95 | 300 | 0.06 | ◉ | ◉ |
| L-25 | S-4 | 1.95 | 30 | 0.005 | ◉ | ◉ |

The coating liquid for forming an intermediate layer was applied to the surface of a gas diffusion base material (manufactured by NOK, trade name: X0086 T10X13) by using a die coater so that the solid content became to be 3 mg/cm², and dried at 80° C., to prepare a gas diffusion base material with an intermediate layer in which an intermediate layer was formed on the surface of the carbon non-woven fabric.

The polymer electrolyte membrane was sandwiched by two ETFE sheets with catalyst layers from both sides, and heat-pressed under the conditions of a press temperature of 160° C., a press time of 2 minutes, and a pressure of 3 MPa, whereby the catalyst layers were bonded to both sides of the polymer electrolyte membrane, and the ETFE sheets were peeled off from the catalyst layers to obtain a membrane catalyst layer assembly having an electrode area of 25 cm².

The membrane electrode assembly used for evaluation of the initial power generation characteristics and evaluation of the hydrogen leak amount was prepared by disposing on the membrane catalyst layer assembly, a gas diffusion base material (manufactured by NOK, trade name: X0086 IX92 CX320) with a carbon layer on the anode side, and the above-mentioned gas diffusion base material with an intermediate layer on the cathode side, so that the carbon layer and the intermediate layer were in contact with the catalyst layer side, respectively, followed by heat pressing at a press temperature of 160° C., a press time of 2 minutes and a pressure of 3 MPa, to prepare a membrane electrode assembly, and then, the power generation characteristics were evaluated.

The membrane electrode assembly to be used for the durability evaluation was prepared by disposing on the membrane catalyst layer assembly, a gas diffusion base material (manufactured by NOK, trade name: X0086 IX92 CX320) with a carbon layer, fired at 350° C. for 2 hours, on the anode side, and a gas diffusion base material (manufactured by NOK, trade name: H2315 T10X6 CX96 modified) with a carbon layer, fired at 350° C. for 2 hours, on the cathode side, so that the carbon layers were, respectively, in contact with the catalyst layer side, and the membrane electrode assembly was sandwiched by the gas diffusion base materials, to obtain a membrane electrode assembly.

As shown in Table 3, in Ex. 7-14 to 7-25 in which the ion exchange capacity, the average particle size of the hardly soluble cerium compound, and the number of cerium atoms in the hardly soluble cerium compound are within the ranges specified in the present invention, it was possible to obtain a polymer electrolyte membrane which was excellent in initial power generation characteristics, was excellent in durability, and had few defects.

In Ex. 7-1 to 7-10, a liquid composition containing a polymer H having an ion exchange capacity of less than 1.36 meq/g was used. In this case, the initial power generation characteristics of the membrane electrode assembly were insufficient, since the proton conductivity of the polymer H was insufficient.

In Ex. 7-11, the average particle size of the hardly soluble cerium compound was larger than the range specified in the present invention, whereby the membrane was defective. Therefore, with respect to the polymer electrolyte membrane obtainable from the composition L-11, it was not possible to evaluate both the initial characteristics and the durability.

In Ex. 7-12, a water-soluble cerium salt was used without using a hardly soluble cerium compound. Therefore, it is considered that the ion exchange groups in the polymer electrolyte membrane were ion-exchanged and the proton conductivity of the polymer electrolyte membrane was lowered, whereby the initial power generation characteristics of the membrane electrode assembly were lowered.

In Ex. 7-13, a membrane electrode assembly was produced without using a cerium compound. Therefore, it is considered that the polymer electrolyte membrane was deteriorated by hydrogen peroxide and peroxide radicals generated during the operation, and the durability was insufficient.

INDUSTRIAL APPLICABILITY

The liquid composition of the present invention is useful as a material for forming a polymer electrolyte membrane for a polymer electrolyte fuel cell.

The polymer electrolyte membrane of the present invention is useful as a polymer electrolyte membrane for a polymer electrolyte fuel cell, and is also useful as a proton selective permeable membrane to be used for water electrodialysis, hydrogen peroxide production, ozone production, waste acid recovery, etc.; a cation exchange membrane for salt electrolysis; a separator of a redox flow battery; a cation exchange membrane for electrodialysis to be used for desalting or salt production; etc.

This application is a continuation of PCT Application No. PCT/JP2019/047934, filed on Dec. 6, 2019, which is based upon and claims the benefit of priority from Japanese Patent Application No. 2018-230348 filed on Dec. 7, 2018. The contents of those applications are incorporated herein by reference in their entireties.

REFERENCE SYMBOLS

10: Membrane electrode assembly,
11: Catalyst layer,
12: Gas diffusion layer,
13: Anode,
14: Cathode,
15: Polymer electrolyte membrane,
16: Carbon layer.

What is claimed is:
1. A liquid composition comprising:
   a liquid medium,
   a sulfonic acid group-containing fluorocarbon polymer, and
   a hardly soluble cerium compound,
   wherein the ion exchange capacity of the sulfonic acid group-containing fluorocarbon polymer is from 1.36 to 2.50 meq/g dry resin,
   the average particle size of the hardly soluble cerium compound is from 1 nm to 3,000 nm,
   the ratio of the total number of moles of cerium atoms in the hardly soluble cerium compound to the total number of moles of sulfonic acid groups contained in the sulfonic acid group-containing fluorocarbon polymer is from 0.001 to 0.3, and
   the sulfonic acid group-containing fluorocarbon polymer has units represented by the following formula u1:

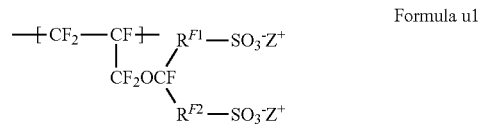

Formula u1 where $R^{F1}$ and $R^{F2}$ are each a $C_{1-3}$ perfluoroalkylene group, $Z^+$ is $H^+$, a monovalent metal ion or an ammonium ion in which at least one hydrogen atom may be substituted by a hydrocarbon group, and $R^{F1}$ and $R^{F2}$ may be the same or different.

2. The liquid composition according to claim 1, wherein the hardly soluble cerium compound is cerium oxide.

3. The liquid composition according to claim 1, wherein the hardly soluble cerium compound has an average particle size of from 1 nm to 400 nm.

4. The liquid composition according to claim 1, wherein the content of the sulfonic acid group-containing fluorocarbon polymer is from 1 to 50 mass % to 100 mass % of the liquid composition.

5. The liquid composition according to claim 1, wherein the liquid medium contains an organic solvent having a hydroxy group.

6. The liquid composition according to claim 1, which further contains cerium ions.

7. A polymer electrolyte membrane comprising
a sulfonic acid group-containing fluorocarbon polymer, and
a hardly soluble cerium compound,
wherein the ion exchange capacity of the sulfonic acid group-containing fluorocarbon polymer is from 1.36 to 2.50 meq/g dry resin,
the average particle size of the hardly soluble cerium compound is from 1 nm to 3,000 nm,
the ratio of the total number of moles of cerium atoms in the hardly soluble cerium compound to the total number of moles of sulfonic acid groups contained in the sulfonic acid group-containing fluorocarbon polymer is from 0.001 to 0.3, and
the sulfonic acid group-containing fluorocarbon polymer has units represented by the following formula u1:

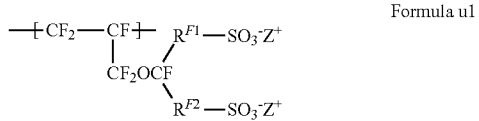

Formula u1 where $R_{F1}$ and $R^{F2}$ are each a $C_{1-3}$ perfluoroalkylene group, $Z^+$ is $H^+$, a monovalent metal ion or an ammonium ion in which at least one hydrogen atom may be substituted by a hydrocarbon group, and $R^{F1}$ and $R^{F2}$ may be the same or different.

8. The polymer electrolyte membrane according to claim 7, wherein the hardly soluble cerium compound is cerium oxide.

9. The polymer electrolyte membrane according to claim 7, wherein the hardly soluble cerium compound has an average particle size of from 1 nm to 400 nm.

10. The polymer electrolyte membrane according to claim 7, which further contain cerium ions.

11. A membrane electrode assembly comprising an anode having a catalyst layer, a cathode having a catalyst layer, and a polymer electrolyte membrane as defined in claim 7, which is disposed between the anode and the cathode.

12. A polymer electrolyte fuel cell provided with the membrane electrode assembly as defined in claim 11.

13. The liquid composition according to claim 1, wherein the hardly soluble cerium compound is cerium oxide, and:
the ion exchange capacity of the sulfonic acid group-containing fluorocarbon polymer is from 1.38 to 2.48 meq/g dry resin,
the average particle size of the hardly soluble cerium compound is from 20 nm to 400 nm, and
the ratio of the total number of moles of cerium atoms in the hardly soluble cerium compound to the total number of moles of sulfonic acid groups contained in the sulfonic acid group-containing fluorocarbon polymer is from 0.003 to 0.035.

14. The polymer electrolyte membrane according to claim 7, wherein the hardly soluble cerium compound is cerium oxide, and:
the ion exchange capacity of the sulfonic acid group-containing fluorocarbon polymer is from 1.38 to 2.48 meq/g dry resin,
the average particle size of the hardly soluble cerium compound is from 20 nm to 400 nm, and
the ratio of the total number of moles of cerium atoms in the hardly soluble cerium compound to the total number of moles of sulfonic acid groups contained in the sulfonic acid group-containing fluorocarbon polymer is from 0.003 to 0.035.

* * * * *